(12) United States Patent
Takahashi et al.

(10) Patent No.: US 9,041,818 B2
(45) Date of Patent: May 26, 2015

(54) IMAGE PICKUP APPARATUS

(71) Applicants: Masafumi Takahashi, Yokohama (JP); Takashi Ando, Kawasaki (JP)

(72) Inventors: Masafumi Takahashi, Yokohama (JP); Takashi Ando, Kawasaki (JP)

(73) Assignee: RICOH COMPANY, LTD., Tokyo (JP)

( * ) Notice: Subject to any disclaimer, the term of this patent is extended or adjusted under 35 U.S.C. 154(b) by 81 days.

(21) Appl. No.: 13/777,378

(22) Filed: Feb. 26, 2013

(65) Prior Publication Data

US 2013/0222664 A1 Aug. 29, 2013

(30) Foreign Application Priority Data

Feb. 28, 2012 (JP) ................. 2012-041260

(51) Int. Cl.
*H04N 5/228* (2006.01)
*H04N 5/232* (2006.01)
*H04N 5/225* (2006.01)

(52) U.S. Cl.
CPC ............ *H04N 5/2328* (2013.01); *H04N 5/2254* (2013.01); *H04N 5/23287* (2013.01); *G03B 2205/0038* (2013.01)

(58) Field of Classification Search
CPC .................................... H04N 5/2328
USPC ................................... 348/333.01
See application file for complete search history.

(56) References Cited

U.S. PATENT DOCUMENTS

| 2009/0128637 | A1* | 5/2009 | Noji ........................... 348/208.1 |
| 2011/0181743 | A1 | 7/2011 | Ando |
| 2012/0027391 | A1* | 2/2012 | Okamura ....................... 396/55 |
| 2012/0038784 | A1 | 2/2012 | Irisawa et al. |

FOREIGN PATENT DOCUMENTS

| JP | 2007-114486 | 5/2007 |
| JP | 2010-231168 | 10/2010 |

* cited by examiner

*Primary Examiner* — Twyler Haskins
*Assistant Examiner* — Akshay Trehan
(74) *Attorney, Agent, or Firm* — Oblon, McClelland, Maier & Neustadt, L.L.P.

(57) ABSTRACT

Provided in an image pickup apparatus are an imaging optical system (12), an image pickup element (22), a fixed member (22) whose position relative to the imaging optical axis OA is fixed, a plurality of movable supporting balls (62), each movably supported with attraction of magnetic force, a movable member (41) in which the image pickup element is provided and which is movably supported by the fixed member with magnetic force through each movable supporting ball (62), a driving mechanism (44, 46, 54, 55, 56, 57) to generate driving force to relatively move the movable member with respect to the fixed member, a display unit (18), a mounting plate to mount the display unit in the casing (11), wherein the mounting plate (70) is provided with a protruding arm portion (74) protruding toward the movable member.

18 Claims, 14 Drawing Sheets

> US 9,041,818 B2

IMAGE PICKUP APPARATUS

CROSS-REFERENCE TO RELATED APPLICATION

The present application claims priority to Japanese Patent Application No. 2012-41260 filed Feb. 28, 2012 to the Japan Patent Office, the entire content of which is incorporated herein by reference in its entirety.

BACKGROUND OF THE INVENTION

1. Technical Field

The present invention relates to an image pickup apparatus such as a digital still camera or a digital video camera (hereinafter referred to as a digital camera) provided with a camera shake correction function to correct camera shake occurring at the time of shooting.

2. Description of the Related Art

There is known an image pickup apparatus that receives light of an object image by an image pickup element through an imaging optical system and generates a digital image corresponding to the object image based on an image signal from the image pickup element. As such image pickup apparatus, a digital camera with a so-called camera shake correction function which includes a camera shake correction mechanism to correct camera shake occurring at the time of shooting has been recently commercially available.

Some of the camera shake correction mechanism employ, for example, a configuration that an image pickup element is moved within the X-Y plane perpendicular to an imaging optical axis depending on a degree of blur of an object image caused by camera shake, where a direction of the imaging optical axis of the imaging optical system as the Z-axis direction (see, for example, Japanese Patent Application Publication No. 2010-231168). In the camera shake correction mechanism, a movable member in which the image pickup element is provided is held to be movable along the X-Y plane by a fixed member provided in a casing and fixed in position relative to the imaging optical system. The fixed member supports the movable member through a plurality of balls made of a magnetic material with attraction of magnetic force, thereby causing the movable member to be movable. For example, the movable member generates driving face by a permanent magnet and a coil facing the permanent magnet and is moved within the X-Y plane perpendicular to the imaging optical axis.

In the camera shake correction mechanism, a plate is provided to cover a rear side of a movable member with the movable member is interposed between the plate and the fixed member when seen in the Z-axis direction and, in which the permanent magnet or coil is provided on this plate. The plate can limit a moving distance of the movable member in the Z-axis direction with respect to the fixed member. Accordingly, the movable member is prevented from becoming incapable of returning to an original state by moving far from the fixed member, i.e., each ball in the Z-axis direction.

SUMMARY OF THE INVENTION

However, the above-described camera shake correction mechanism requires that the plate having a size dimension covering the movable member is provided on the rear side of the movable member and is also provided in the fixed member. Accordingly, there is room for improvement because the larger plate causes layout constraint and the size dimension in the Z-axis direction (direction of the imaging optical axis) is increased.

The invention has been made in view of the foregoing circumstances. Accordingly, an object of the invention is to provide an image pickup apparatus capable of suppressing layout constraint and an increase in a size dimension in the direction of the imaging optical axis and preventing a movable member from dropping out from a fixed member.

To achieve the above described object, an image pickup apparatus according to an embodiment of the invention comprises: an imaging optical system including at least one optical member; an image pickup element to acquire an object image formed by the imaging optical system; a fixed member provided in a casing with a position fixed relative to the imaging optical axis when seen in a direction perpendicular to the imaging optical axis; a plurality of movable supporting balls made of a magnetic material and movably supported with attraction of magnetic force by the fixed member; a movable member in which the image pickup element is provided and which is movable along a plane perpendicular to the imaging optical axis with respect to the fixed member by being supported by the fixed member with the magnetic force through each supporting ball; a driving mechanism configured to generate driving force to relatively move the movable member with respect to the fixed member utilizing force which is received by a current from the magnetic field; a display unit capable of display the object image acquired by the image pickup element; and a mounting plate to mount the display in the casing. The mounting plate is provided with a protruding arm portion protruding toward the movable member.

BRIEF DESCRIPTION OF THE DRAWINGS

FIG. 4 is schematic perspective view showing the configuration in which a lens barrel 13 and a mounting plate 70 are provided in a casing 11 formed in such a manner that a rear side cover member 11a and a front side cover member 11b are assembled with each other, in which A shows positional relationship between the lens barrel 13 and the mounting plate 70 in the casing 11 and B shows a positional relationship of the mounting plate 70 relative to the rear side cover member 11a;

FIG. 18 is a graph showing a change of suction of a ball supporting magnet 61 relative to a change in distance, in which the horizontal axis is shown by a distance d (mm) between the actuation stage 41 (the movable frame portion 42) and the lens barrel base 33 and the vertical axis is shown by suction fh (N) acting by magnetic force of the ball supporting magnet 61a between the ball receiving plate 49a and the movable supporting ball 62a.

DESCRIPTION OF THE PREFERRED EMBODIMENT

Figure 1A:
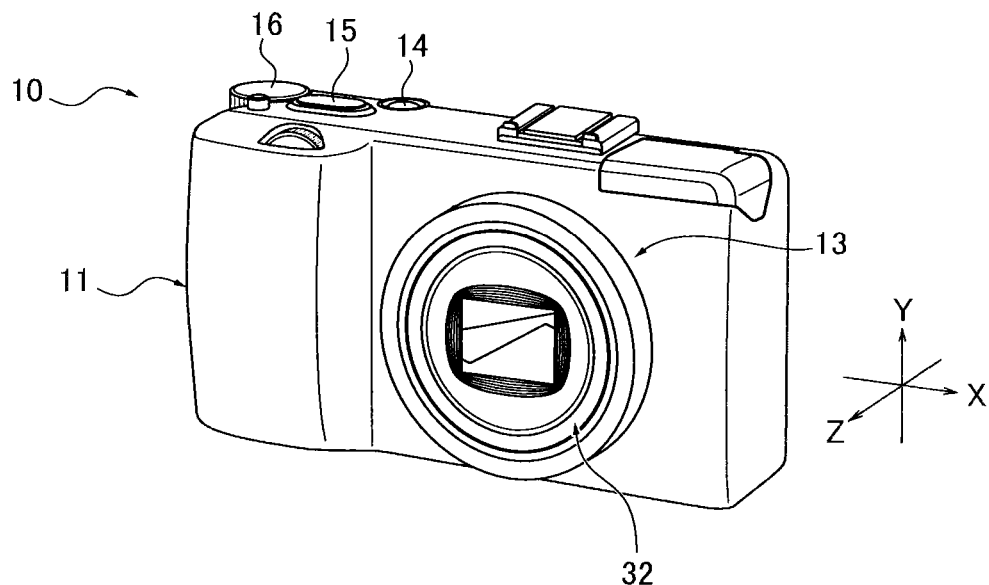
FIG. 1 is an illustration showing different states of a lens barrel 13 in a digital camera 10 as an example of an image pickup apparatus according to the invention, in which A shows a housed position and B shows an extended position.

Hereinafter, an embodiment of an image pickup apparatus according to the invention is described by referring to the drawings.

Embodiment

A schematic configuration of a digital camera 10 which is an image pickup apparatus as an embodiment of an image pickup apparatus according to the invention is described by using FIG. 1 to FIG. 15. It is assumed in the following description that using the digital camera 10 as a reference, a direction of an optical axis (see an arrow OA in FIG. 1B) of an imaging optical system 12 in a lens barrel 13 provided in a casing 11, which is described later, is a Z-axis direction (an object side is a positive side (a front side)) and is also referred to as an anteroposterior direction in Embodiment 1. It is also assumed that a direction perpendicular to the optical axis (the imaging optical axis OA (the Z-axis direction)) of the imaging optical system 12 is an X-axis direction (a right side when FIG. 1 is seen from the front side is a positive side) and is also referred to as a lateral direction in Embodiment 1. Furthermore, it is assumed that a direction perpendicular to the X-axis direction and the Z-axis direction is a Y-axis direction (an upper side when FIG. 1 is seen from the front side is a positive side) and is also referred to as a vertical direction (a height direction) in Embodiment 1.

Figure 1B:
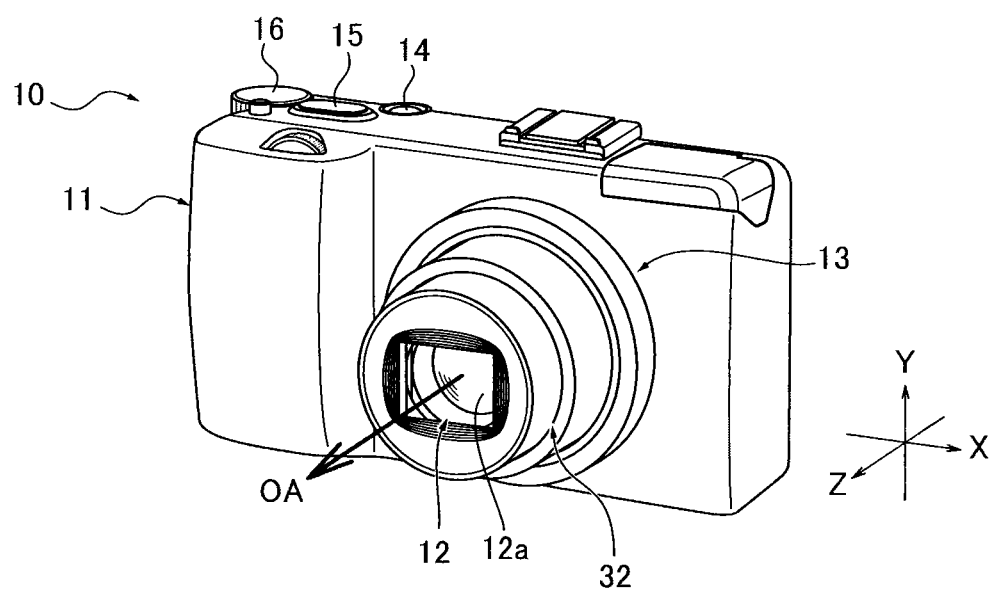
Figure 2:
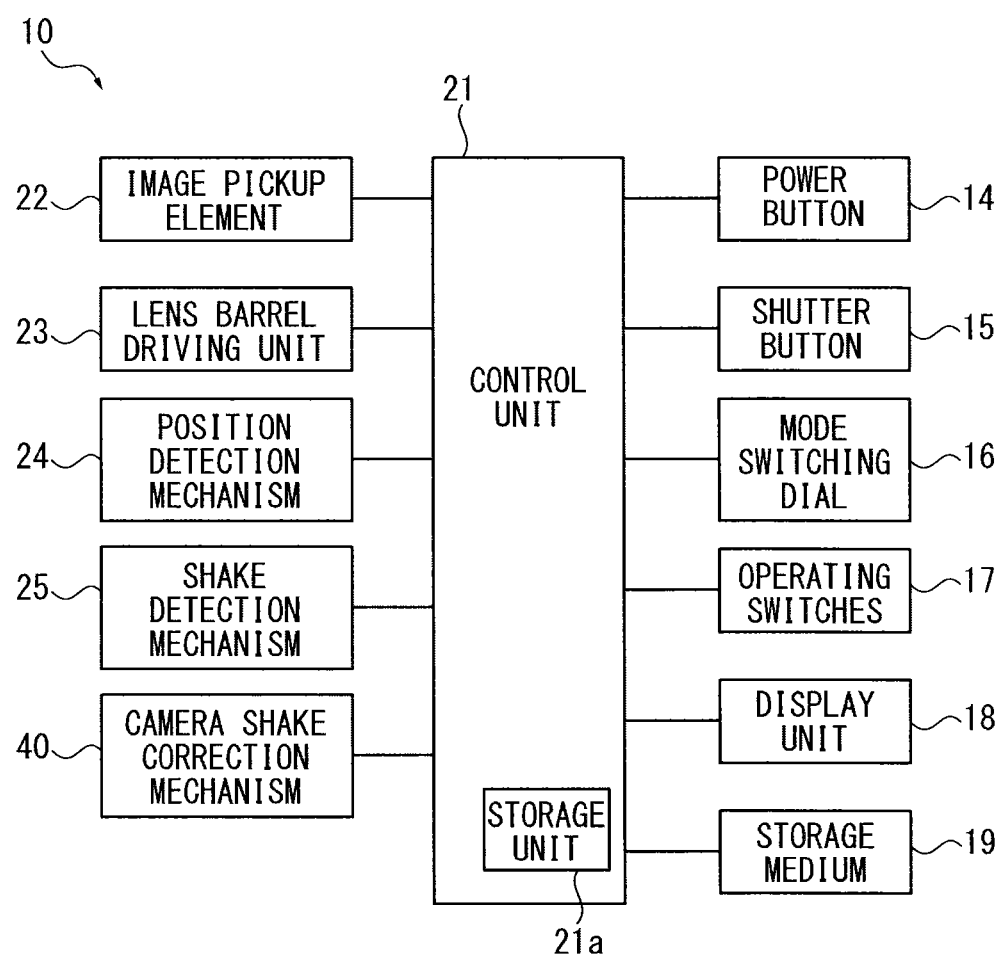
FIG. 2 is an illustration showing control blocks in the digital camera 10.
Figure 3:
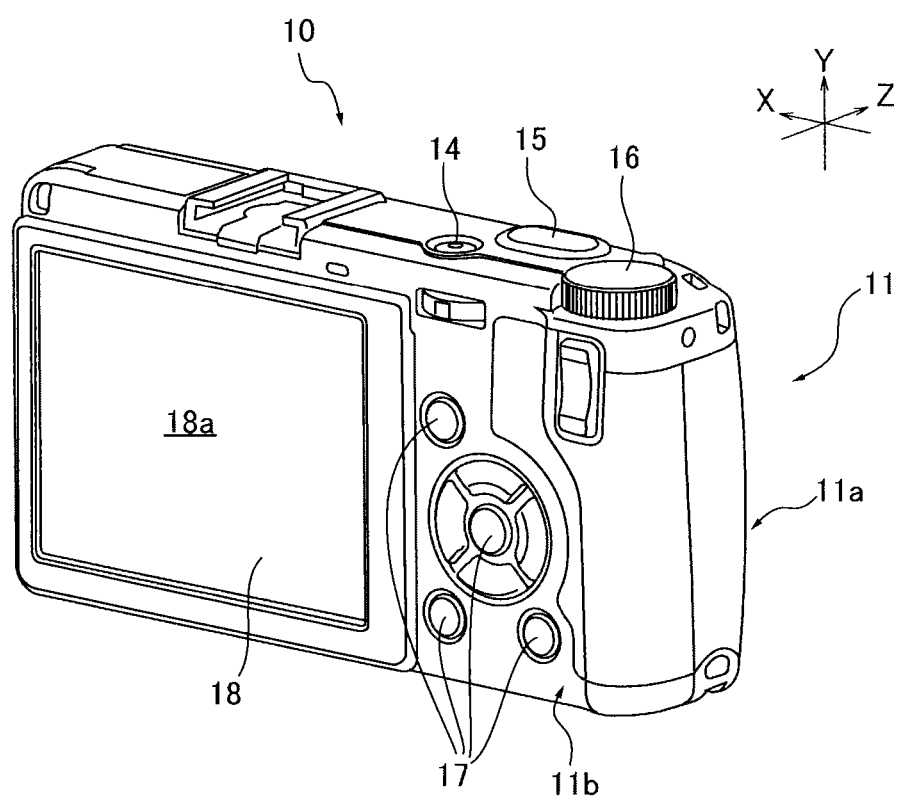
FIG. 3 is a schematic perspective view of the digital camera 10 seen from the rear side thereof.

First, the digital camera 10 as an example of an electronic device according to the invention is described using FIG. 1 to FIG. 3. The digital camera 10 of the embodiment has a camera shake correction function (a camera shake correction mechanism 40 to be described later) to correct camera shake by causing an image pickup element (an image pickup element 22 to be described later) to move within a plane perpendicular to the direction of the imaging optical axis. As shown in FIG. 1, the digital camera 10 has a generally cuboid casing 11, and is provided with a lens barrel 13 having the imaging optical system 12 (see FIG. 1B) on a front side (a side on the near side (the positive side of the Z-axis direction) when FIG. 1A is seen from the front side) of the casing 11. This imaging optical system 12 includes a plurality of optical members such as an object lens 12a (see FIG. 1B) disposed proximate to an object, a fixed lens (not shown), a zoom lens 12b (see FIG. 7), a shutter unit 12c (see FIG. 16 and the like), and an aperture unit (not shown). Each optical member as the imaging optical system 12 is held by the lens barrel 13 to be movable in the direction of the optical axis of the imaging optical system 12 (see an arrow OA in FIG. 1B). It is assumed herein that an optical axis line in the imaging optical system 12, i.e., a rotational symmetry axis to be a center axis position of the optical elements in an imaging state is an imaging optical axis OA.

The lens barrel 13 is movable in an extending or retreating direction (extension and retraction) between a predetermined housed position (see FIG. 1A) and a predetermined extended position (an imaging stand-by state (see FIG. 1B)). The lens barrel 13 is moved between the predetermined housed position (see FIG. 1A) and the predetermined extended position (see FIG. 1B), so that each optical member (not shown) of the imaging optical system 12 (see FIG. 1B) is moved as predetermined.

As an operation unit, the casing 11 has a power button 14, a shutter button 15, and a mode switching dial 16, which are provided on the upper surface (an upper side when FIG. 1 is seen from the front side). The power button 14 is for performing an operation of activating (activation operation) the digital camera 10 and an operation of stopping (stop operation) the digital camera 10. The shutter button 15 is for performing an operation of pressing downward in the vertical direction to execute an operation of shooting an object. The mode switching dial 16 is for setting various types of scene modes, a photo mode, a movie mode, and the like.

Also, as shown in FIG. 3, other operating switches 17 and a display unit 18 (a display surface 18a thereof) are provided on the rear side (the surface on the near side when FIG. 3 is seen from the front side (a negative side of the Z-axis direction)) of the casing 11. These operating switches 17 are a direction indication switch for setting each menu and the like or various kinds of switches. Also, the display unit 18 displays an image based on captured image data or image data recorded in a storage medium 19.

As shown in FIG. 2, the digital camera 10 includes a control unit 21, an image pickup element 22, a lens barrel driving unit 23, a position detection mechanism 24, a shake detection mechanism 25, and a camera shake correction mechanism 40. With programs stored in a storage unit 21a, the control unit 21 integrally performs driving processing based on operations made through the power button 14, the shutter button 15, the mode switching dial 16, and the operating switches 17, as an operating unit, image data creation processing based on a signal from the image pickup element 22, and control of driving the lens barrel driving unit 23 and the camera shake correction mechanism 40. In the control unit 21, an image is captured by the image pickup element 22 through the imaging optical system 12 and the captured image is displayed as needed in the display unit 18 provided on the rear side of the casing 11. Detection signals are input to the control unit 21 from the position detection mechanism 24 and the shake detection mechanism 25. Also, the control unit 21 is capable of storing information (such as image data) in the storage medium 19 loaded into an unillustrated insertion portion and extracting the information.

The image pickup element 22 includes a solid-state image pickup element such as a CCD imaging sensor or CMOS imaging sensor. The image pickup element 22 is provided on an image plane side of the imaging optical system 12 and the imaging optical axis OA in the lens barrel 13 through the camera shake correction mechanism 40 to be described later (see FIG. 16). The image pickup element 22 converts an object image formed on the light-receiving surface 22a (see FIG. 8) through the imaging optical system 12 into electric signals (image data) and outputs the signals. The output electric signals (image data) are transmitted to the control unit 21.

In order to cause the lens barrel 13 to move between the housed position (see FIG. 1A) and the extended position (see FIG. 1B), the lens barrel driving unit 23 moves an optical member holding frame (not shown) supporting each optical member of the imaging optical system 12.

The position detection mechanism 24 is for detecting a position of the actuation stage 41 (see FIG. 5 and the like) with respect to the lens barrel base 33 to be described later. In the present embodiment, it includes the Hall element and is provided in the actuation stage 41 (see reference numerals 45 and 47 in FIG. 9).

The shake detection mechanism 25 is a shake detection mechanism for detecting shake caused in the digital camera 10 itself (the casing 11), i.e., movement of the digital camera 10 in space. Although the shake detection mechanism 25 is not shown in the present embodiment, it includes a gyro sensor, which is provided in the casing 11. Note that the shake detection mechanism 25 can be configured by using an acceleration sensor. The position detection mechanism 24 and the shake detection mechanism 25 output detection signals to the control unit 21.

In the digital camera 10, when a first step pressing operation is made on the shutter button 15, the control unit 21 controls the lens barrel driving unit 23 to execute a focus adjustment operation. Also, in the digital camera 10, when a second step pressing operation is made on the shutter button 15, the control unit 21 creates image data of an object image whose light is received by the light-receiving surface 22a (see FIG. 8) of the image pickup element 22 through the imaging optical system 12 and stores the image data as needed in the storage medium 19. Furthermore, in the digital camera 10, under the control of the control unit 21, an image based on the created image data or an image based on the image data extracted from the storage medium 19 can be displayed as needed on the display unit 18.

(Configuration of Lens Barrel 13)

Figure 4A:
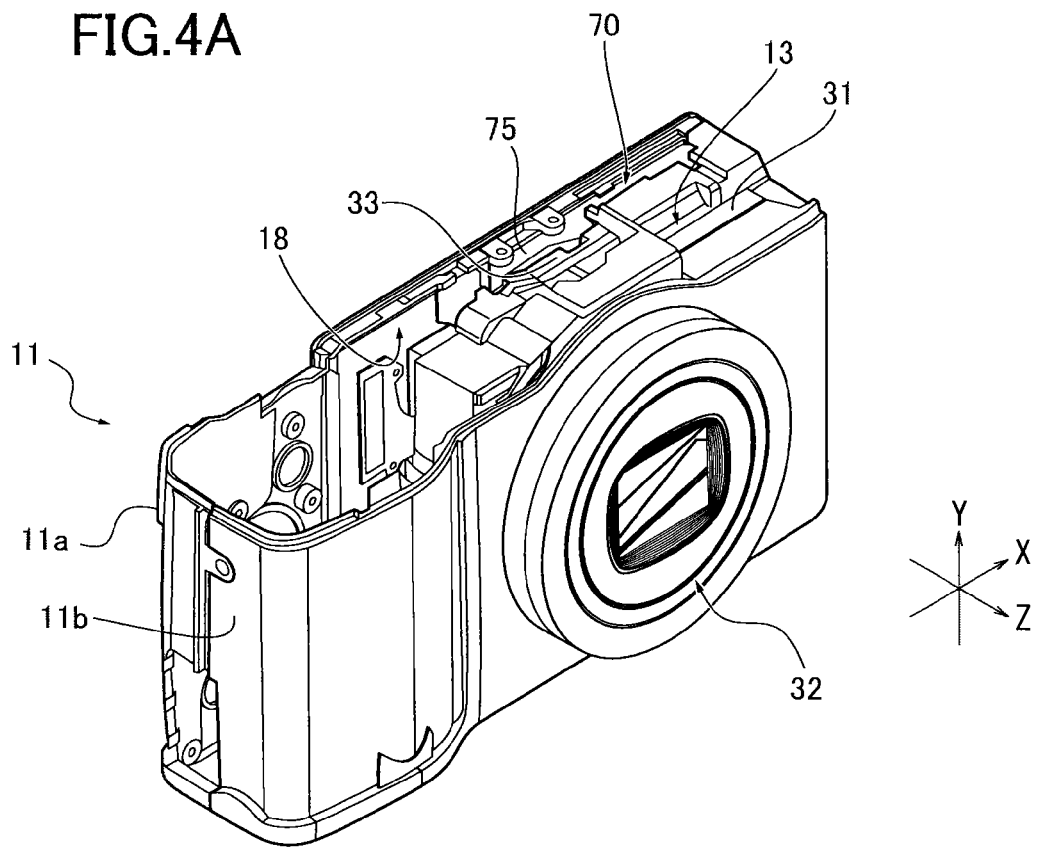
Figure 5:
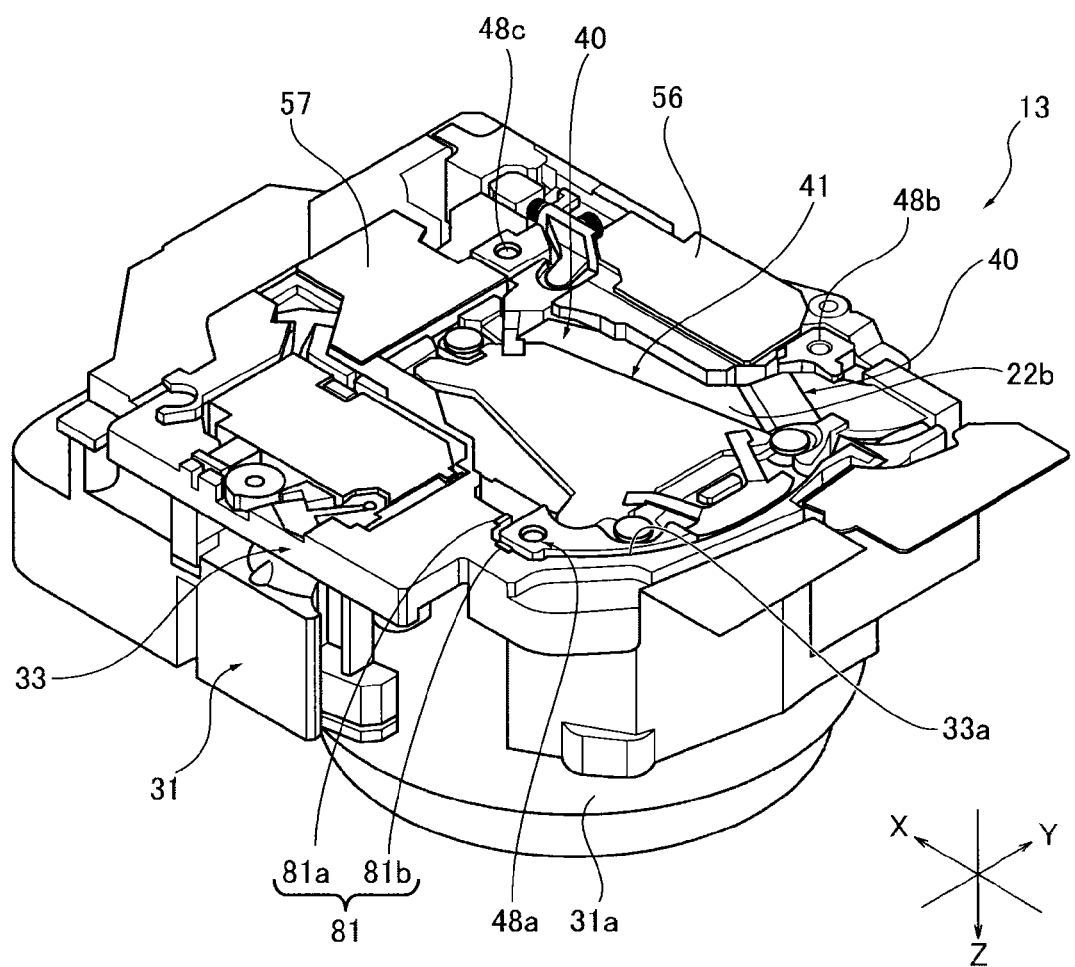
FIG. 5 is a schematic perspective view showing the configuration of the lens barrel 13.
Figure 6:
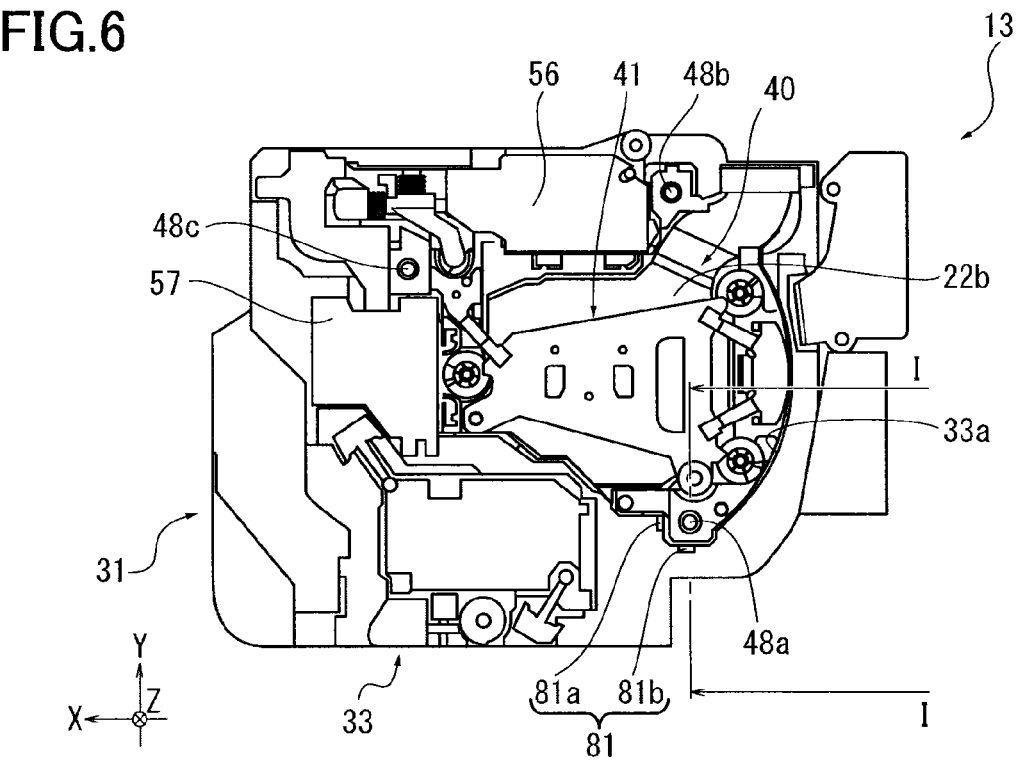
FIG. 6 is a front view showing the configuration of the lens barrel 13 seen from a negative side of the Z-axis direction.
Figure 7:
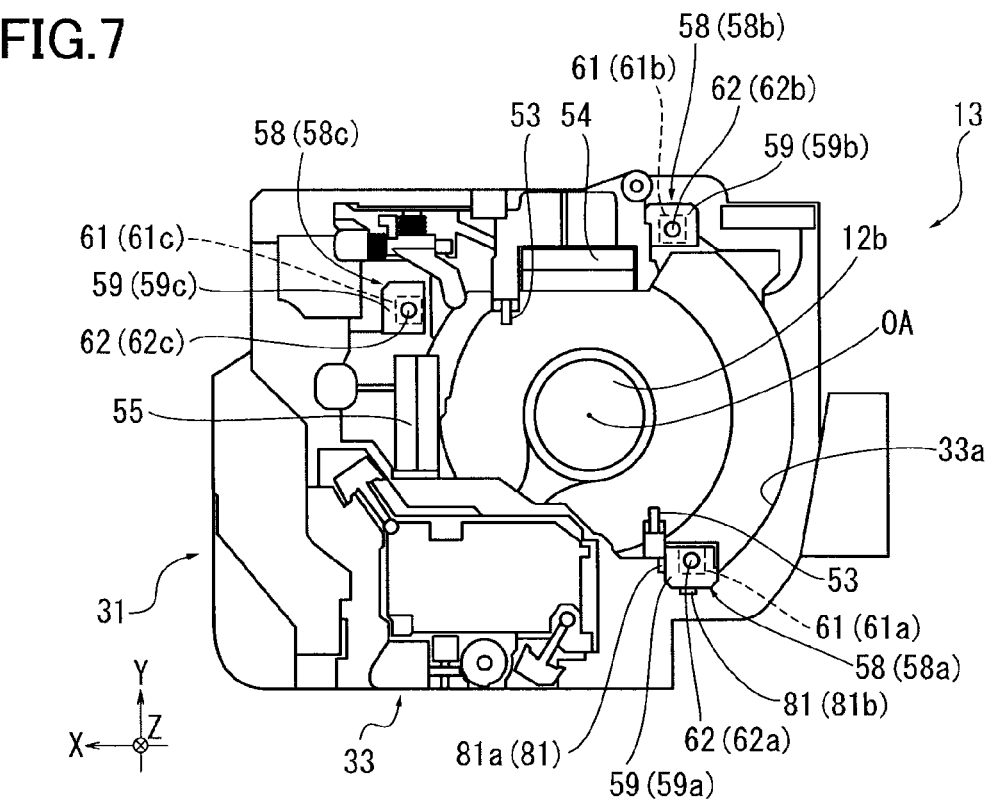
FIG. 7 is a front view showing the configuration of the lens barrel 13 as similar to FIG. 6, in which an actuation stage 41, a vertical side yoke 56, and a horizontal side yoke 57 are omitted.

In the digital camera 10, as shown in FIG. 4A, the casing 11 is configured in such a manner that a rear side cover member 11a and a front side cover member 11b are assembled in the Z-axis direction (the direction of the imaging optical axis OA), and the lens barrel 13 is provided between the rear side cover member 11a and the front side cover member 11b. As shown in FIGS. 5 to 7, the lens barrel 13 includes a fixed frame 31, a movable lens barrel 32 (see FIG. 1, FIG. 16 and the like) and a lens barrel base 33. The fixed frame 31 is integrally formed on a positive side of the Z-axis direction (an object side) of the lens barrel base 33 in which the camera shake correction mechanism 40 is provided, and has a fixed barrel unit 31a having a cylindrical shape inside thereof. The fixed barrel unit 31a is fixed on the front side (the positive side of the Z-axis direction) of the lens barrel base 33. The lens barrel base 33 is provided with the camera shake correction mechanism 40 which corrects camera shake in such a manner that the image pickup element 22 is moved on a plane perpendicular to the imaging optical axis OA. This camera shake correction mechanism 40 is described later. Although it is not shown in the drawing, a straight-running groove along the axis direction (the Z-axis direction) or a cam groove inclined toward the axis direction is formed in an inner periphery of the fixed barrel unit 31a.

The movable lens barrel 32 (see FIG. 1, FIG. 16 and the like) is provided inside of the fixed barrel unit 31a. The movable lens barrel 32 is designed to be movable in the direction of the imaging optical axis OA with respect to the fixed barrel unit 31a in order to move a plurality of optical members of the imaging optical system 12 in the direction of the imaging optical axis OA. Although it is not shown in the drawing, the movable lens barrel 32 has a rotating barrel which rotates around the imaging optical axis OA as a rotational center and moves in the direction of the imaging optical axis OA, a liner which moves in the imaging optical axis OA without rotation, or optical member holding frames which respectively hold optical members of the imaging optical system 12. Although it is not shown in the drawing, in the movable lens barrel 32, a key portion or cam follower provided in the rotating barrel and the liner is inserted to be capable of interfering the straight-running groove and the cam groove of the fixed barrel unit 31a, so that the movement with respect to the fixed barrel unit 31a becomes possible.

Although it is not shown in the drawing, a gear groove is provided in an outer periphery of the rotating barrel in the movable lens barrel 32, and a gear provided in the output axis of a motor configuring the lens barrel driving unit 23 (see FIG. 2) is engaged with the gear groove. Although it is not shown in the drawing, provided in an inner periphery of the rotating barrel and the liner are a key projection portion of each optical member storage frame (an optical member holding member, a rotating barrel, or a liner) provided in the inner side thereof, a straight-running groove into which helicoid or the like is inserted to be capable of interfering, and helicoid or the like. With this configuration, in the movable lens barrel 32, driving force of the motor (not shown) is transmitted as needed to the gear through the gear of the lens barrel driving unit 23, which is engaged with the gear groove. Then, the rotating barrel (not shown) rotates around the imaging optical axis in the fixed barrel unit 31a, so that the rotating barrel, the liner, and the optical member holding frame are moved as needed in the direction of the imaging optical axis OA with respect to the fixed barrel unit 31a.

Accordingly, the lens barrel 13 is moved between the predetermined stored position (see FIG. 1A) and the predetermined extended position (an imaging stand-by state (see FIG. 1B)) (an extending or retreating movement (extension and retraction)), and the imaging optical system 12 (see FIG. 1B) of each optical member (not shown) is moved as predetermined in the direction of the imaging optical axis OA. For this reason, the fixed barrel unit 31a functions as an optical member storage frame which stores each optical member (not shown) of the imaging optical system 12 (see FIG. 1B) together with the rotating barrel, the liner, and the optical member holding frame which are not shown. In addition, the lens barrel driving unit 23 functions as a storage frame driving means which drives the optical member storage frame as needed by rotating the movable lens barrel 32 (the rotating barrel thereof) as needed with the unillustrated motor.

Although it is not shown in the drawing, once the lens barrel 13 is set in the predetermined stored portion (see FIG. 1B), the lens barrel driving unit 23 operates the zoom lens 12b (see FIG. 7) to be positioned on the imaging optical axis OA (an imaging optical path) and focus as predetermined.

Figure 16:
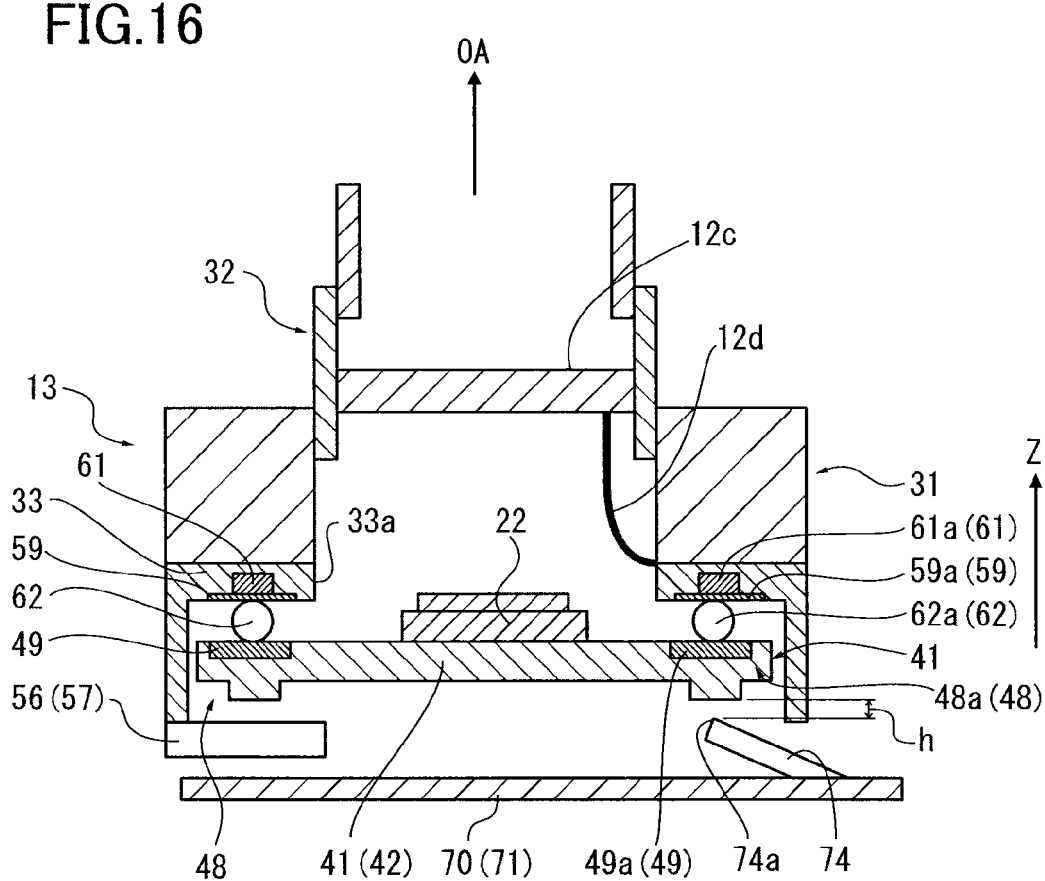
FIG. 16 is an illustration showing a schematic configuration of a camera shake correction mechanism 40 and the mounting plate 70 in the lens barrel 13.

The lens barrel base 33 of the lens barrel 13 generally has a plate-like shape parallel to the X-Y plane, and is provided in the negative side of the Z-axis direction of the movable lens barrel 32 (the imaging optical system 12) which is movably held by the fixed frame 31, i.e., the fixed barrel unit 31a (see FIG. 16). A window hole 33a passing in the direction of the imaging optical axis OA (the Z-axis direction) is provided in the lens barrel base 33 with a positional relationship including the imaging optical axis OA. The image pickup element 22 which is caused to be movable by the camera shake correction mechanism 40 is provided in the window hole 33a (see FIG. 16 and the like).

(Configuration of Camera Shake Correction Mechanism 40)

Figure 8:
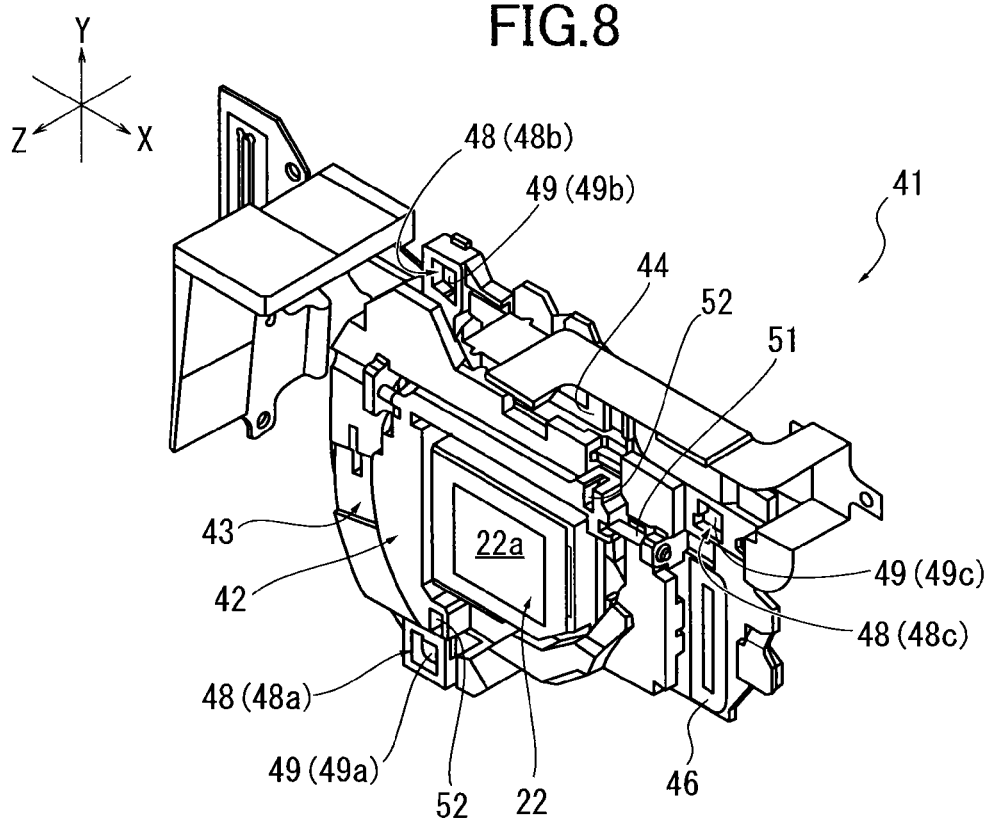
FIG. 8 is a schematic perspective view showing the configuration of the actuation stage 41.
Figure 9:
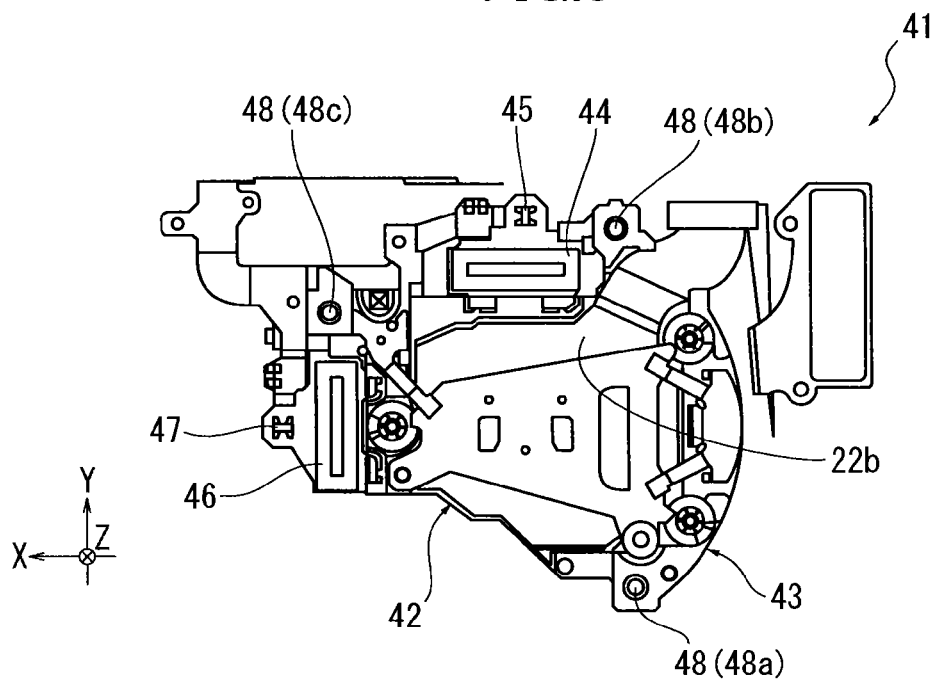
FIG. 9 is a front view showing the configuration of the actuation stage 41 seen from a negative side of the Z-axis direction.

The camera shake correction mechanism 40 corrects camera shake by moving the actuation stage 41 in which the image pickup element 22 is provided in a plane (the X-Y plane) perpendicular to the direction of the imaging optical axis OA (the Z-axis direction) with respect to the lens barrel base 33. The actuation stage 41 is provided in the lens barrel base 33 (the window hole thereof) and, as shown in FIG. 8 and FIG. 9, has a movable frame portion 42 and a rotation restricting portion 43. The movable frame portion 42 generally has a plate-like shape parallel to the X-Y plane and is provided with (holds) the image pickup element 22 on a surface (on the near side when FIG. 8 is seen from the front side) on the positive side of the Z-axis direction (an object side). In the camera shake correction mechanism 40, a flexible substrate 22b (see FIG. 9) is provided on the rear side of the image pickup element 22 provided in the movable frame portion 42 of the actuation stage 41. The flexible substrate 22b electrically connects the image pickup element 22, the camera shake correction mechanism 40, and the control unit 21 (see FIG. 2) with one another.

In addition, a vertical driving coil 44 and a vertical position detection sensor 45 (see FIG. 9) are provided in the movable frame portion 42 on the positive side of the Y-axis direction when seen from the image pickup element 22 as well as a horizontal driving coil 46 and a horizontal position detection sensor 47 (see FIG. 9) on the positive side of the X-axis direction. The vertical driving coil 44 and the horizontal driving coil 46 are not clearly shown in the drawing, but are coil members of wound electric wires and generate driving force which causes the actuation stage 41 (the movable frame portion 42) to move parallel to the X-Y plane with respect to the lens barrel base 33 as described later. The vertical position detection sensor 45 detects a position in the Y-axis direction of the actuation stage 41 with respect to the lens barrel base 33 in cooperation with a magnet (not shown) provided in the lens barrel base 33, and includes the Hall element in the embodiment. The horizontal position detection sensor 47 detects a position in the Z-axis direction of the actuation stage 41 with respect to the lens barrel base 33 in cooperation with a magnet (not shown) provided in the lens barrel base 33, and includes the Hall element in the embodiment. The vertical position detection sensor 45 and the horizontal position detection sensor 47 configure the above-described position detection mechanism 24 (see FIG. 2) in cooperation with the magnet (not shown) provided in the lens barrel base 33. For this reason, a state where the imaging optical axis OA (Z-axis direction) is the horizontal direction and the Y-axis direction is a vertical direction is used as a basic position of the digital camera 10 (the casing 11). In the basic position, the vertical position detection sensor 45 detects a position of the actuation stage 41, i.e., the image pickup element 22 in the vertical direction in cooperation with the magnet (not shown) and the horizontal position detection sensor 47 detects a position of the actuation stage 41, i.e., the image pickup element 22 in the horizontal direction in cooperation with the magnet (not shown).

Furthermore, there are three ball receiving portions 48 provided in the movable frame portion 42. In each ball receiving portion 48, the surface of the movable frame portion 42 is formed to be recessed toward the negative side of the Z-axis direction and the positive side of the Z-axis direction is formed to be rectangularly opened. As described later, the ball receiving portion 48 limits a range of movement of the movable supporting ball 62 with respect to the movable frame portion 42. Each ball receiving portion 48 has a ball receiving plate 49 (see FIG. 10 and the like) made of a magnetic material provided on the bottom (a plane on the negative side of the Z-axis direction in the inner side of the ball receiving portion 48). Each ball receiving plate 49 is positioned equally when seen in the direction of the imaging optical axis OA (the Z-axis direction). In the following description, when the three ball receiving portions 48 are individually mentioned, they are referred to as a ball receiving portion 48a (a ball receiving plate 49a), a ball receiving portion 48b (a ball receiving plate 49b), and a ball receiving portion 48c (a ball receiving plate 49c).

As shown in FIG. 8, the movable frame portion 42 is mounted in the rotation restricting portion 43 through a restriction shaft 51. The restriction shaft 51 has a bar-like shape extending parallel to the X-axis direction and is fixed in the rotation restricting portion 43. The movable frame portion 42 supports the restriction shaft 51 to be movable in the X-axis direction. For this reason, the movable frame portion 42 can move in the X-axis direction with respect to the rotation restricting portion 43 by way of the restriction shaft 51. The rotation restricting portion 43 has two bearing slits 52 provided therein. The two bearing slits 52 extend in the Y-axis direction and have a surface of the rotation restricting portion 43 (a plane on the positive side of the Z-axis direction) being formed to be recessed toward the negative side of the Z-axis direction and can movably accept restriction pins 53 (see FIG. 7) of the lens barrel base 33 which are described later.

As shown in FIG. 7, the lens barrel base 33 in which the actuation stage 41 is provided has restriction pins 53, a vertical driving magnet 54, and a horizontal driving magnet 55. Each restriction pin 53 has a bar-like shape protruding from the lens barrel base 33 to be parallel to the Y-axis direction toward the inner side of the window hole 33a, and is provided in an edge portion on the positive side of the Y-axis direction of the window hole 33a and an edge portion on the negative side of the Y-axis direction. The both restriction pins 53 have a positional relationship corresponding to that of the two bearing slits 52 (see FIG. 8) provided in the rotation restricting portion 43 of the actuation stage 41.

The vertical driving magnet 54 is a permanent magnet which is polarized and magnetized in the Y-axis direction and has a positional relationship in which it faces the vertical driving coil 44 (see FIG. 8 and FIG. 9) provided in the actuation stage 41 (the movable frame portion 42 thereof) in the Z-axis direction. The horizontal driving magnet 55 is a permanent magnet which is polarized and magnetized in the X-axis direction and has a positional relationship in which it faces the horizontal driving coil 46 (see FIG. 8 and FIG. 9) provided in the actuation stage 41 (the movable frame portion 42 thereof) in the Z-axis direction. Although it is not shown in the drawing, the vertical driving magnet 54 and the horizontal driving magnet 55 have a plate member (a yoke) made of a magnetic material integrally provided on the positive side of the Z-axis direction (on the lens barrel base 33 side). A vertical side yoke 56 is mounted on the Z-axis direction side of the vertical driving magnet 54 and a horizontal side yoke 57 is mounted on the Z-axis direction side of the horizontal driving magnet 55 (see FIG. 5 and FIG. 6).

The vertical side yoke 56 is a plate member made of a magnetic material, which is integrally formed with the permanent magnet (not shown) whose one polar faces the other polar of the vertical driving magnet 54. The vertical side yoke 56 has a positional relationship in which it faces the vertical driving magnet 54 in the Z-axis direction by way of the vertical driving coil 44 provided in the actuation stage 41 (the movable frame portion 42). The vertical side yoke 56 (the permanent magnet integrally formed therewith) configures a so-called voice coil motor in cooperation with the vertical driving coil 44 and vertical driving magnet 54 (the plate member integrally formed therewith) of the actuation stage 41.

The horizontal side yoke 57 is a plate member made of a magnetic material, which is integrally formed with the permanent magnet (not shown) whose one polar faces the other polar of the horizontal driving magnet 55 in the Z-axis direction. The horizontal side yoke 57 has a positional relationship (see FIGS. 6, 7, and 9) in which it faces the horizontal driving magnet 55 in the Z-axis direction while the horizontal driving coil 44 provided in the actuation stage 41 (the movable frame portion 42 thereof) is interposed therebetween. The horizontal side yoke 57 (the permanent magnet integrally formed therewith) configures a so-called voice coil motor in cooperation with the horizontal driving coil 46 and horizontal driving magnet 55 (the plate member integrally formed therewith) of the actuation stage 41.

Accordingly, a current flows through the vertical driving coil 44 as needed, and force in the Y-axis direction (hereinafter, also referred to as vertical driving force) acts on the vertical side yoke 56 and the vertical driving magnet 54 (the plate member integrally formed therewith) which face each other in the Z-axis direction. In addition, a current flows through the horizontal driving coil 46 as needed, and force in the X-axis direction (hereinafter, also referred to as horizontal driving force) acts on the horizontal side yoke 57 (the permanent magnet integrally formed therewith) and the horizontal driving magnet 55 (the plate member integrally formed therewith) which face each other in the Z-axis direction. Thus, in the camera shake correction mechanism 40, a current flows through the vertical driving coil 44 and the horizontal driving coil 46, so that vertical driving force and horizontal driving force which move along the X-Y plane with respect to the lens barrel base 33 can act on the actuation stage 41 (the movable frame portion 42 thereof).

Also, the lens barrel base 33 has three installation recessed portions 58 provided therein. Each installation recessed portion 58 is formed in such a manner that the rear surface (a plane on the negative side of the Z-axis direction) of the lens barrel base 33 is recessed toward the positive side of the Z-axis direction and the negative side of the Z-axis direction is rectangularly opened and is opened toward the inner side of the window hole 33a of the lens barrel base 33. As described above, each installation recessed portion 58 accepts each ball receiving portion 48 of the movable frame unit and becomes a portion to restrict the moving range of the movable supporting ball 62 with respect to the lens barrel base 33. For this reason, each installation recessed portion 58 has a positional relationship such that it faces one of the three ball receiving portions 48 provided in the actuation stage 41 (the movable frame portion 42) in the Z-axis direction. Note that in the following description, when the three installation recessed portions 58 are individually mentioned, they are referred to as an installation recessed portion 58a, an installation recessed portion 58b, and an installation recessed portion 58c. In other words, the positional relationship is such that the installation recessed portion 58a faces the ball receiving portion 48a in the Z-axis direction, the installation recessed portion 58b faces the ball receiving portion 48b in the Z-axis direction, and the installation recessed portion 58c faces the ball receiving portion 48c in the Z-axis direction.

Each installation recessed portion 58 has a ball supporting plate 59 and a ball supporting magnet 61 which are provided therein. Each ball supporting plate 59 is a rectangular flat plate member when seen from the Z-axis direction and is provided in the bottom (a plane on the positive side of the Z-axis direction in the inner side of the installation recessed portion 58) of each installation recessed portion 58. Each ball supporting plate 59 forms the same plane continuing to the bottom of each installation recessed portion 58 (see FIG. 10 and FIG. 15B) and is positioned equally when seen in the direction of the imaging optical axis OA (the Z-axis direction). Each ball supporting magnet 61 is formed of a permanent magnet and is provided to be embedded and fixed on the rear side of each ball supporting plate 59, i.e., on the positive side of the Z-axis direction of each ball supporting plate 59 (see FIG. 10 and FIG. 15B). When the ball supporting plates 59 and the ball supporting magnets 61 are individually mentioned, they are referred to as a ball supporting plate 59a (a ball supporting magnet 61a), a ball supporting plate 59b (a ball supporting magnet 61b), and a ball supporting plate 59c (a ball supporting magnet 61c).

A movable supporting ball 62 is provided on the ball supporting plate 59 in the inner side of each installation recessed portion 58. Each movable supporting ball 62 is a sphere made of a magnetic material and has an equal size dimension. Each movable supporting ball 62 has a diameter dimension (a size dimension) smaller than a size dimension in the inner side of each ball receiving portion 48 in the actuation stage 41 (the movable supporting ball 62) and a size dimension of each installation recessed portion 58 (each ball supporting plate 59) (see FIGS. 7, 10, and 15B). Each movable supporting ball 62 is disposed on the corresponding ball supporting plate 59 (on the negative side of the Z-axis direction). Then, each movable supporting ball 62 faces the ball supporting magnet 61 in the Z-axis direction through the ball supporting plate 59 (see FIG. 10 and FIG. 15B) and thus is supported by the ball supporting plate 59, i.e., the lens barrel base 33 (the rear surface thereof) with attraction of magnetic force. At this time, each movable supporting ball 62 is attracted by the ball supporting magnet 61 and is disposed on the plate-like ball supporting plate 59, and thus it can roll and move on the ball supporting plate 59 in the state being supported with attraction being maintained. Note that in the following description, when the movable supporting balls 62 are individually mentioned, they are referred to as a movable supporting ball 62a, a movable supporting ball 62b, and a movable supporting ball 62c.

Figure 10:
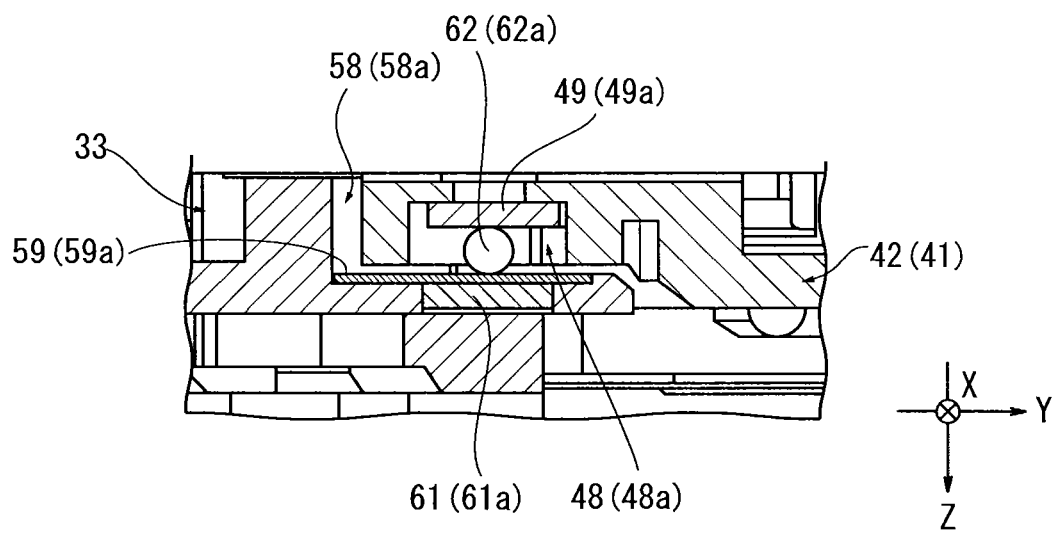
FIG. 10 is a cross-sectional view taken along the I-I line shown in FIG. 6.
Figure 15A:
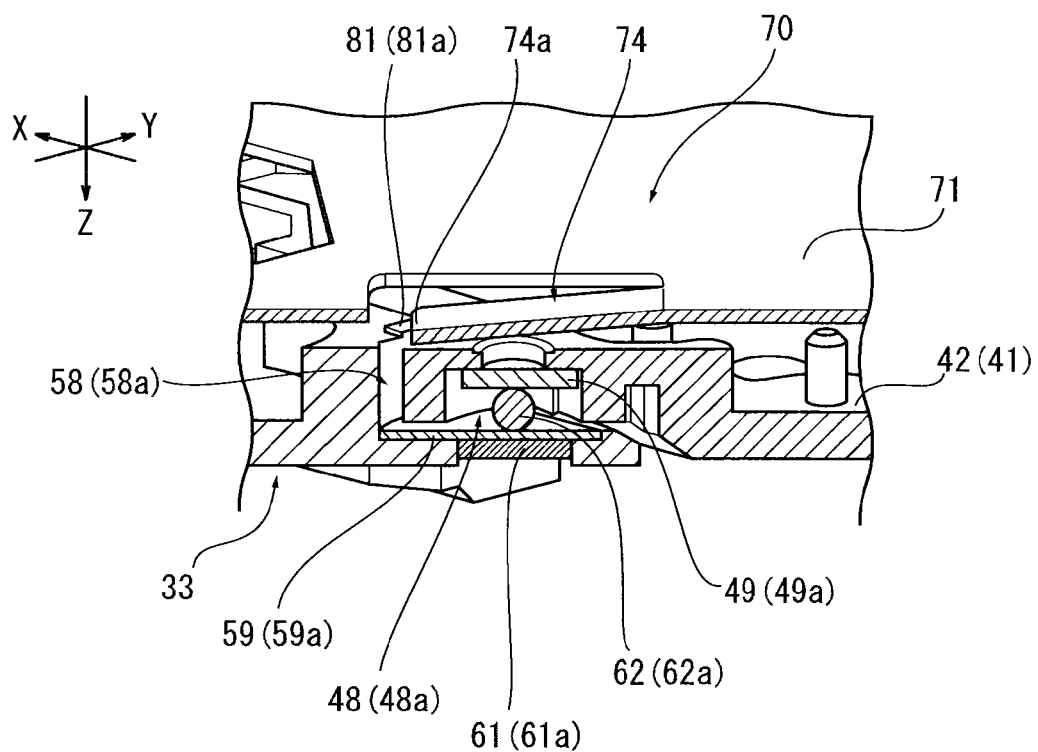
FIG. 15 is an illustration showing a cross-section taken along the II-II line shown in FIG. 12, in which A is a perspective view seen from the negative side of the Z-axis direction and B is a cross-sectional view seen from a direction parallel to the X-Y plane.
Figure 15B:
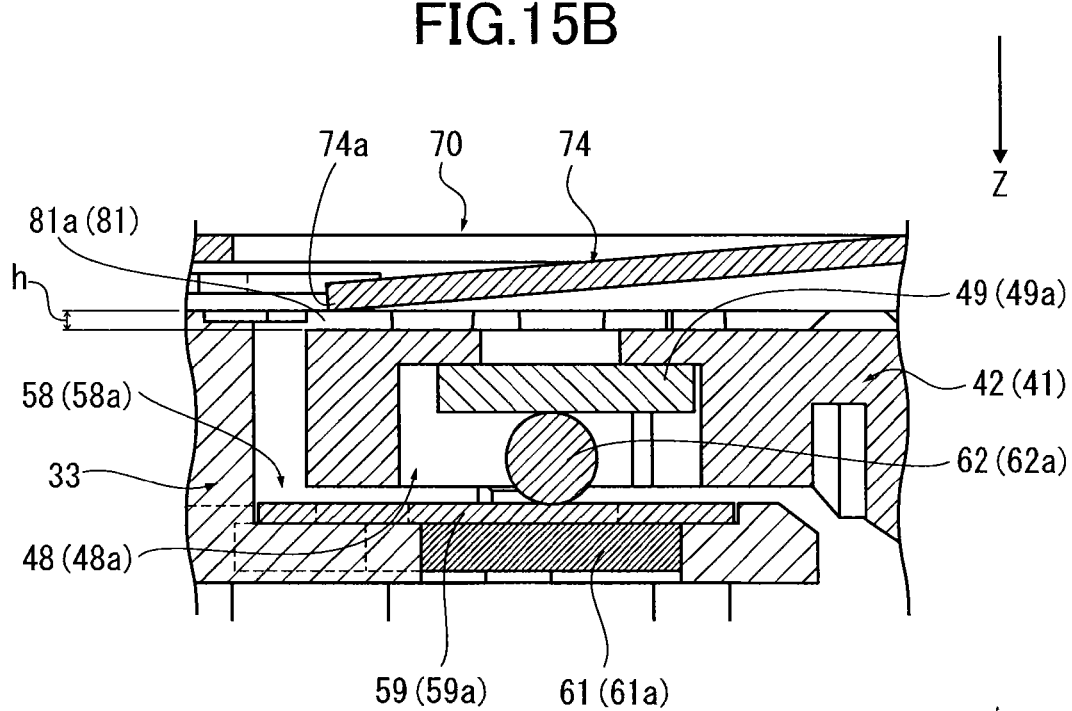

The actuation stage 41 is provided in the lens barrel base 33 with the above-described configuration, configuring the camera shake correction mechanism 40. In other words, the positional relationship is such that each restriction pin 53 of the lens barrel base 33 is inserted into each bearing slit 52 of the rotation restricting portion 43 of the actuation stage 41, the ball receiving portion 48a of the actuation stage 41 (the movable frame portion 42) is disposed in the installation recessed portion 58a of the lens barrel base 33, the ball receiving portion 48b of the actuation stage 41 (the movable frame portion 42) is disposed in the installation recessed portion 58b of the lens barrel base 33, and the ball receiving portion 48c of the actuation stage 41 (the movable frame portion 42) is disposed in the installation recessed portion 58c of the lens barrel base 33, and the actuation stage 41 is put from the rear side of the lens barrel base 33 (see FIG. 5 and FIG. 6). Accordingly, as shown in FIG. 10 and FIG. 15B, the movable supporting ball 62 provided on the ball supporting plate 59 of each installation recessed portion 58 of the lens barrel base 33 comes in contact with each ball receiving portion 48 of the movable frame portion 42 of the actuation stage 41 in the Z-axis direction (the direction of the imaging optical axis OA). Then, since the ball receiving plate 49 made of a magnetic material is provided inside each ball receiving portion 48 of the movable frame portion 42 of the actuation stage 41, the ball receiving plate 49 faces the ball supporting magnet 61 in the Z-axis direction through the movable supporting ball 62 and the ball supporting plate 59, and thus is supported by each ball supporting plate 59, i.e., the lens barrel base 33 (the rear surface thereof) with attraction of magnetic force.

At this time, each ball receiving plate 49 has a plate-like shape and is attracted with the magnetic force of the ball supporting magnet 61. Thus, with the state where the actuation stage 41 is supported by the lens barrel base 33 with the magnetic force, being maintained, the movable supporting ball 62 is caused to be capable of relatively rolling and moving. In addition, as described above, each ball receiving plate 49 has an equal size dimension and each ball receiving plate 49 is positioned equally in the Z-axis direction in the actuation stage 41 (the movable frame portion 42), and each ball supporting plate 59 is positioned equally in the lens barrel base 33 (the rear side thereof) in the Z-axis direction. For this reason, the actuation stage 41 is supported by the three movable supporting balls 62 provided between the lens barrel base 33 to be capable of smoothly and stably move along the plane (the X-Y plane) perpendicular to the direction of the imaging optical axis OA (the Z-axis direction) with respect to the lens barrel base 33 and a position in the direction of the imaging optical axis OA (the Z-axis direction) with respect to the lens barrel base 33 is properly defined. The moving range of the actuation stage 41 along the X-Y plane with respect to the lens barrel base 33 is restricted by the ball supporting plate 59 on which each movable supporting ball 62 is disposed and each ball receiving portion 48.

At this time, the movable frame portion 42 is caused to be movable in the X-axis direction with respect to the rotation restricting portion 43 by way of the restriction shaft 51, and the rotation restricting portion 43 movably receives each restriction pin 53 of the lens barrel base 33 by each bearing slit 52 in the Y-axis direction. Thus, when the actuation stage 41 moves along the X-Y plane, the movable frame portion 42 is prevented from rotating with respect to the lens barrel base 33 around the Z-axis direction. Accordingly, the image pickup element 22 held by the actuation stage 41 is caused to be movable along the X-Y plane within a predetermined range with respect to the lens barrel base 33, i.e., the imaging optical system 12 (the imaging optical axis OA thereof) of the lens barrel 13.

In addition, as described above, in this state, the vertical driving coil 44 provided in the movable frame portion 42 of the actuation stage is present between the vertical side yoke 56 (the permanent magnet integrally formed therewith) provided in the lens barrel base 33 and the vertical driving magnet 54 (a plate member integrally formed therewith) and the horizontal driving coil 46 provided in the movable frame portion 42 of the actuation stage 41 is present between the horizontal side yoke 57 (the plate member integrally formed therewith) provided in the lens barrel base 33 and the horizontal driving magnet 55 (the plate member integrally formed therewith) (see FIGS. 6, 7, and 9). Thus, with respect to the lens barrel base 33, i.e., the imaging optical system 12 (the imaging optical axis OA thereof) of the lens barrel 13, vertical driving force and horizontal driving force can be acted on the actuation stage 41 (the movable frame portion 42) which is caused to be movable along the X-Y plane within a predetermined range. Accordingly, in the camera sake correction mechanism 40, the actuation stage 41, i.e., the image pickup element 22 held therein can be moved along the X-Y plane.

In this camera shake correction mechanism 40 (the control unit 21), an origin position in the X-Y plane within a movable range of the actuation stage 41 (the movable frame portion 42) is set. In the embodiment, the origin position is matched with the center position in the movable range and is positioned on the imaging optical axis OA. The origin position is stored in the storage unit 21a (see FIG. 2) provided in the control unit 21 and can be acquired by the control unit 21 as needed. Also, in the camera shake correction mechanism 40, under the control of the control unit 21 (see FIG. 2), a movement target position is set based on shake detection information from the shake detection mechanism 25 (see FIG. 2), a moving direction and a moving distance from the origin position to the movement target position are calculated. Then, in order to move the actuation stage 41 by the calculated moving direction and moving distance, an apply current to the vertical driving coil 44 and the horizontal driving coil 46 is controlled.

With this control, the horizontal driving force and the vertical driving force are acted as needed, so that the actuation stage 41, i.e., the image pickup element 22 can be moved to a predetermined position on the X-Y plane with respect to the imaging optical axis OA (the lens barrel base 33). At this time, the control unit 21 (see FIG. 2) performs servo control based on the position detection information from the position detection mechanism 24 (see FIG. 2) (the vertical position detection sensor 45 and the horizontal position detection sensor 47 (see FIG. 9)) in order to properly move the actuation stage 41 to the set movement target position. Accordingly, in the digital camera 10, i.e., in the camera shake correction mechanism 40, the control unit 21 controls a current applying to the vertical driving coil 44 and the horizontal driving coil 46, to cancel the camera shake by moving it on the X-Y plane and causing the image pickup element 22 to follow the movement of an image of an object. As described above, the camera shake can be corrected. Also, in the digital camera 10, i.e., in the camera shake correction mechanism 40, the control unit 21 controls a current applying to the vertical driving coil 44 and the horizontal driving coil 46 based on the data of the origin position stored in the storage unit 21a (see FIG. 2). Accordingly, the actuation stage 41, i.e., the image pickup element 22 can be moved to the origin position set on the imaging optical axis OA and can keep being in the origin position.

Figure 4B:
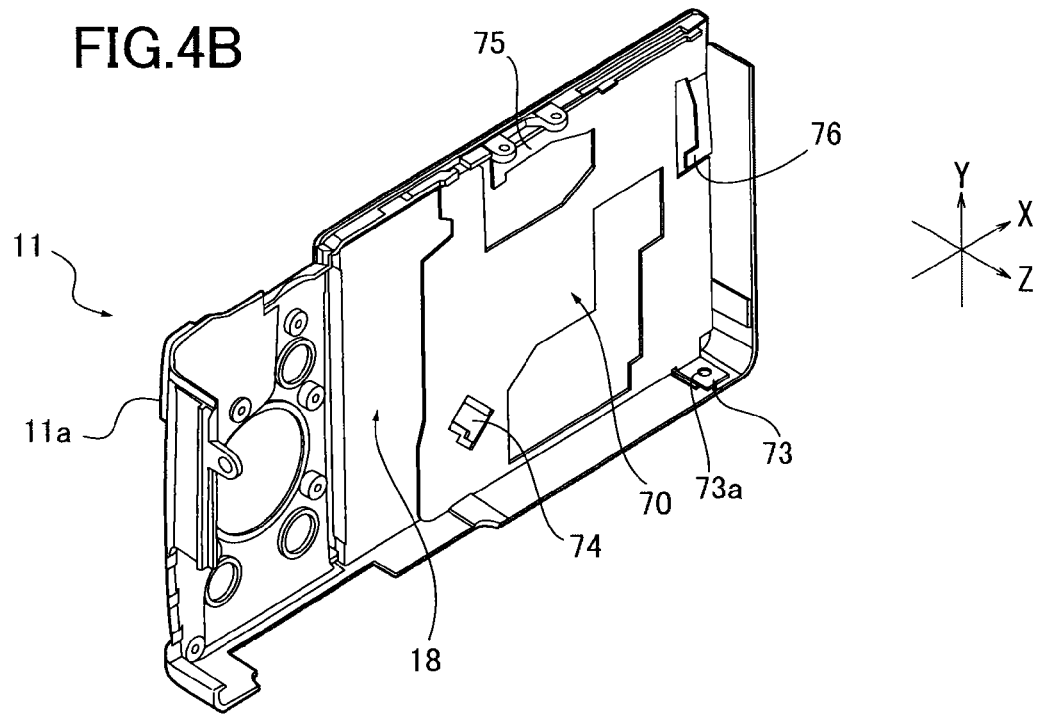
Figure 11:
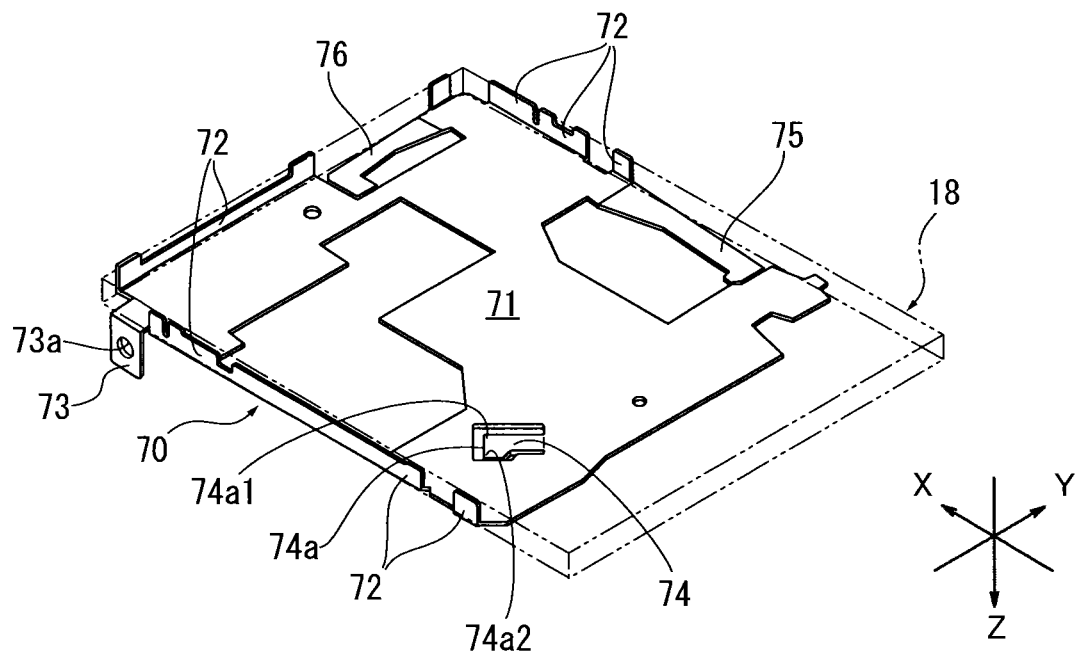
FIG. 11 is a schematic perspective view showing the configuration of the mounting plate 70, in which a display unit 18 fixed therein is shown by the two-dot chain line.

Hereinafter, characteristic portions of the digital camera 10 of the invention are described. As shown in FIG. 4B, the digital camera 10 of the embodiment is provided with a mounting plate 70 in rear side cover member 11a of the casing 11. As shown in FIG. 11, the mounting plate 70 generally has a plate-like shape and is formed of an elastic deformable member. The mounting plate 70 is configured in such a manner that a holding wall portion 72, a mounting piece portion 73, a first plate spring portion 74, a second plate spring portion 75, a third plate spring portion 76 are provided in a plate-like mounting body portion 71. The holding wall portion 72 is formed so that a portion protruding from the edge portion of the mounting body portion 71 is bent toward the negative side of the Z-axis direction and has a plate-like shape along a plane including an extending direction of the bent edge portion and the Z-axis direction. In the embodiment, the holding wall portion 72 is provided in the mounting body portion 71 on the both edges when seen in the Y-axis direction and an edge portion on the positive side of the X-axis direction.

The mounting piece portion 73 is formed so that a portion protruding from the edge portion of the mounting body portion 71 is bent toward the positive side of the Z-axis direction and has a plate-like shape along a plane including an extending direction of the bent edge portion and the Z-axis direction. The mounting piece portion 73 has a mounting hole 73a. The mounting piece portion 73 is caused to be capable of mounting the mounting plate 70 on the rear side cover member 11a of the casing 11 by using the mounting hole 73a.

The first plate spring portion 74 is provided in an internal position on the negative side of the X-axis direction and the negative side of the Y-axis direction in the mounting body portion 71 (the third quadrant in the X-Y plane using the center of the mounting body portion 71 as a reference). The first plate spring portion 74 is formed by partially cutting out the mounting body portion 71 to a U-letter shape and being bent toward the positive side of the Z-axis direction using a linear portion which is not cut out as a base, and has a plate-like shape along a plane inclined to the mounting body portion 71, i.e., the X-Y plane. Accordingly, the first plate spring portion 74 has a protruding end portion 74a from the mounting body portion 71 having a line-like shape parallel to the X-Y plane, and a pair of corner portions 74a1, 74a2 (see FIG. 14 and the like) is provided on the both end portions in the extending direction of the protruding end portion 74a. As described later, in a state where the mounting plate 70 and the lens barrel 13 are mounted in the casing 11 (see FIG. 4A), in order to cause the first plate spring portion 74 to be capable of coming into contact with a pressed portion 81 (see FIG. 5 and the like) of the lens barrel base 33 from the positive side of the Z-axis direction, a pressing force amount F1 (see FIG. 13) in the protruding end portion 74a, a size dimension of the protruding end portion 74a, and a bent angle (an inclined angle) with respect to the mounting body portion 71 (the X-Y plane), i.e., a position of the protruding end portion 74a when seen in the Z-axis direction are set. This is described later.

The second plate spring portion 75 is provided on the negative side of the X-axis direction in the edge portion on the positive side of the Y-axis direction of the mounting body portion 71. The second plate spring portion 75 is formed by partially cutting out an edge portion of the mounting body portion 71 to an L-letter shape and being bent toward the positive side of the Z-axis direction using a linear portion which is not cut out as a base, and has a plate-like shape along a plane inclined to the mounting body portion 71, i.e., the X-Y plane. As described later, in a state where the mounting plate 70 and the lens barrel 13 are mounted in the casing 11 (see FIG. 4A), in order to cause the second plate spring portion 75 to be capable of coming into contact with the lens barrel base 33 from the positive side of the Z-axis direction, a size dimension and a bent angle (an inclined angle) with respect to the mounting body portion 71 (the X-Y plane) are set.

The third plate spring portion 76 is provided on the positive side of the Y-axis direction in the edge portion on the positive side of the X-axis direction of the mounting body portion 71. The third plate spring portion 76 is formed by partially cutting out an edge portion of the mounting body portion 71 to an L-letter shape and being bent toward the positive side of the Z-axis direction using a linear portion which is not cut out as a base, and has a plate-like shape along a plane inclined to the mounting body portion 71, i.e., the X-Y plane. As described later, in a state where the mounting plate 70 is mounted in the casing 11 (see FIG. 4A), in order to cause the third plate spring portion 76 to be capable of coming into contact with the lens barrel base 33 from the positive side of the Z-axis direction, a size dimension and a bent angle (an inclined angle) with respect to the mounting body portion 71 (the X-Y plane) are set.

For this reason, the first plate spring portion 74, the second plate spring portion 75, and the third plate spring portion 76 (each plate spring portion) protrude from the mounting body portion 71 toward the positive side of the Z-axis direction. In addition, each plate spring portion (the first plate spring portion 74, the second plate spring portion 75, and the third plate spring portion 76) has a flat plate shape along a plane inclined to the mounting body portion 71 (the X-Y plate), in which the mounting plate 70 formed of an elastic deformable material is partially bent. Accordingly, when force in the Z-axis direction is acted on the protruding end portion from the mounting body portion 71 (the protruding end portion 74a in the first plate spring portion 74 (see FIG. 14 and the like)), each plate spring portion curves and deforms in the force direction and functions as a so-called plate spring which returns to an original position (an initial position) when the force is canceled. In other words, each plate spring portion (the first plate spring portion 74, the second plate spring portion 75, and the third plate spring portion 76) is a plate spring capable of demonstrating elasticity acting against a displacement operation to the positive side of the Z-axis direction.

Furthermore, in the digital camera 10 of the embodiment, as shown in FIG. 5 to FIG. 7, a pressed portion 81 is provided in the lens barrel base 33 of the lens barrel 13. In the embodiment, the pressed portion 81 is provided in an inner periphery of the window hole 33a which passes through in the Z-axis direction and is provided in the lens barrel base 33, and in a portion where the installation recessed portion 58a is provided (see FIG. 7). The pressed portion 81 is formed in such a manner that neighboring portions of two adjacent sides of the installation recessed portion 58a having the rectangular shape when seen in the Z-axis direction are respectively and partially protruded on the negative side of the Z-axis direction (see FIG. 14). In other words, the pressed portion 81 is configured in such a manner that the pressed portion 81a is provided on the positive side of the X-axis direction with respect to the installation recessed portion 58a and the pressed portion 81b is provided on the negative side of the Y-axis direction. As described above, in the state where the mounting plate 70 and the lens barrel 13 are properly provided in the casing 11, the pressed portion 81a has a positional relationship in which it faces the corner portion 74a1 of the protruding end portion 74a of the first plate spring portion 74 in the Z-axis direction. Also, as described later, in the state where the mounting plate 70 and the lens barrel 13 are properly provided in the casing 11, the pressed portion 81a has a positional relationship in which it faces the corner portion 74a2 of the protruding end portion 74a of the first plate spring portion 74 in the Z-axis direction. For this reason, as described above, in the state where the mounting plate 70 and the lens barrel 13 are properly provided in the casing 11, the first plate spring portion 74 has a positional relationship in which it stands in line in the Z-axis direction (the direction of the imaging optical axis OA) with the installation recessed portion 58a (the ball supporting plate 59a and ball supporting magnet 61a thereof) (see FIG. 15). The pressed portion 81a and the pressed portion 81b are positioned equally when seen in the direction of the imaging optical axis OA (the Z-axis direction) in the lens barrel base 33.

Hereinafter, how to mount the mounting plate 70 is described. First, as shown in FIG. 11, the display unit 18 is disposed on a plane on the negative side of the Z-axis direction of the mounting plate 70 with the surface opposite to the display surface 18a (see FIG. 18a) being put on the mounting body portion 71. The display unit 18 generally has a thin cuboid shape and has a positional relationship determined by bringing the both sides thereof in the Y-axis direction and the side on the positive side of the X-axis direction to come into contact with the holding wall portion 72. Although it is not shown in the drawing, the display unit 18 is fixed with a screw member or adhesion in the state where it is positioned with respect to the mounting plate 70.

As shown in FIG. 4B, the mounting plate 70 on which the display unit 18 is mounted has a positional relationship in which the display surface 18a is exposed from an opening portion (not shown) provided in the rear side cover member 11a of the casing 11 and is mounted in the rear side cover member 11a. The mounting plate 70 is fixed in the rear side cover member 11a with a screw member passing through the mounting hole 73a of the mounting piece portion 73, though it is not shown in the drawing.

Thereafter, the lens barrel 13 (see FIG. 5 and the like) configured as described above on the front side cover member 11b of the casing 11 is disposed and the rear side cover member 11a in which the mounting plate 70 (the display unit 18) is fixed is assembled with the front side cover member 11b (see FIG. 4A). As shown in FIG. 4A, the lens barrel 13 is disposed on the rear side (on the negative side of the Z-axis direction) of the front side cover member 11b in such a manner that the movable lens barrel 32 provided in the fixed barrel unit 31a of the fixed frame 31 is passed through the lens opening portion (not clearly shown in the drawing) provided in the front side cover member 11b and a rotating posture in the rotation in the Z-axis direction (the imaging optical axis OA) is regarded as proper. The rear side cover member 11a in which the mounting plate 70 (the display unit 18) is fixed is assembled with the front side cover member 11b in the Z-axis direction with the mounting plate 70 being put on the lens barrel base 33 of the lens barrel 13. The front side cover member 11b and the rear side cover member 11a are assembled by using a screw member or adhesion, though it is not shown in the drawing, and the casing 11 storing the mounting plate 70 and the lens barrel 13 is formed.

Figure 12:
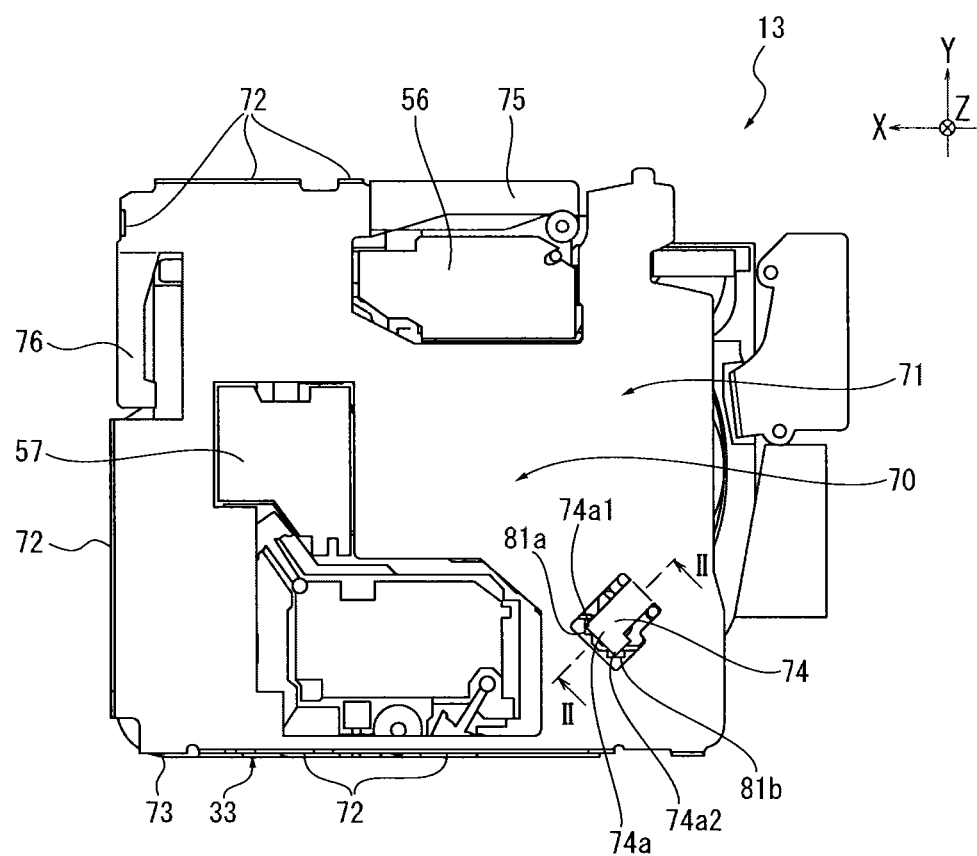
FIG. 12 is a front view similar to FIG. 6 and seen from the negative side of the Z-axis direction, which shows a positional relationship among the mounting plate 70, the lens barrel 13, and a lens barrel base 33 in the formed casing 11.
Figure 13:
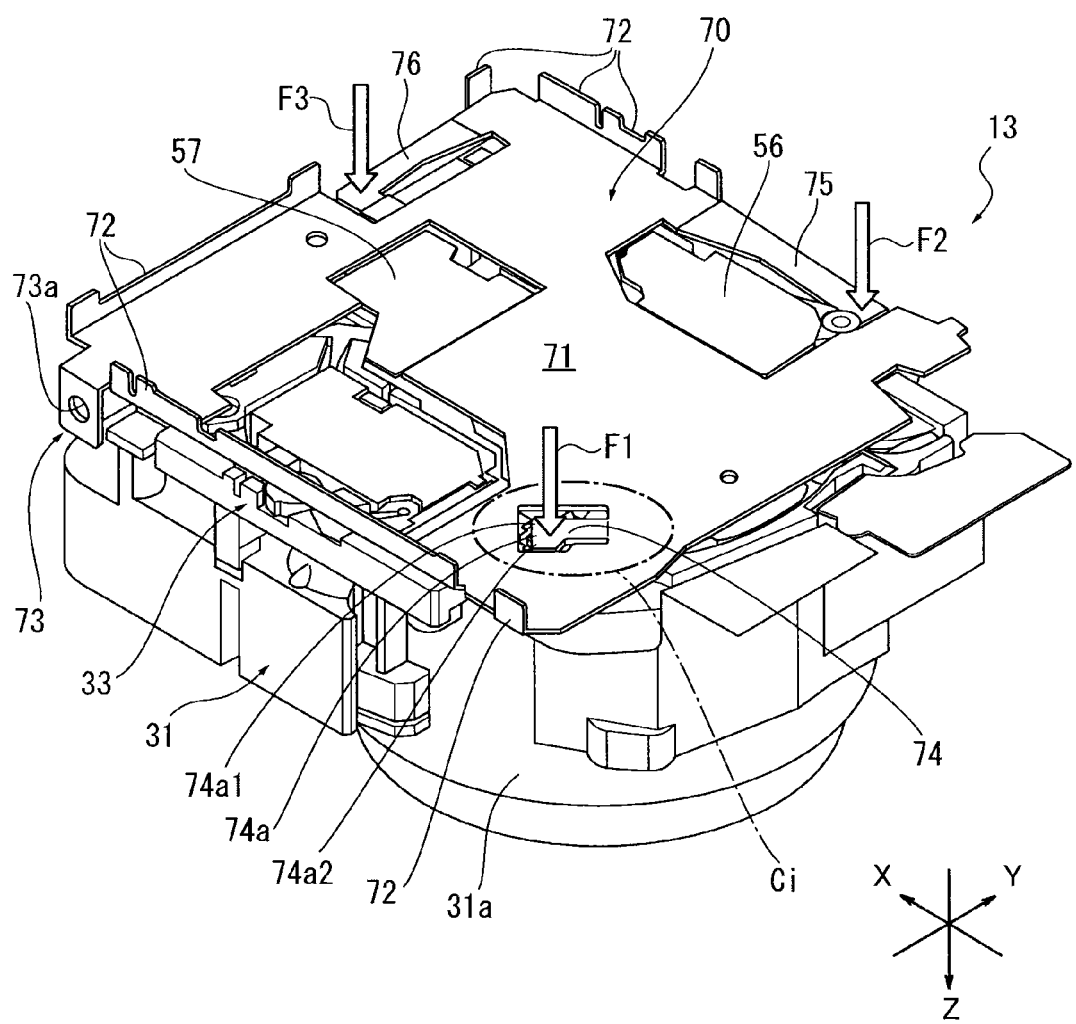
FIG. 13 is a perspective view similar to FIG. 5, which shows a positional relationship among the mounting plate 70, the lens barrel 13, and the lens barrel base 33 in the formed casing 11.

Once the casing 11 is formed as described above, in the mounting plate 70, the protruding end portion of each plate spring portion (the first plate spring portion 74, the second plate spring portion 75, and the third plate spring portion 76), which protrudes from the mounting body portion 71 toward the positive side of the Z-axis direction is pressed against the lens barrel base 33 of the lens barrel 13 in the Z-axis direction (see FIG. 12 and the like). FIG. 12 to FIG. 15 show the positional relationship between the mounting plate 70 and the lens barrel base 33 of the lens barrel 13 in the casing 11. For simplicity, in FIG. 12 to FIG. 15, other members of the mounting plate 70 and the lens barrel 13 (the lens barrel base 33) are omitted. As shown in FIG. 12 and FIG. 13, the second plate spring portion 75 of the mounting plate 70 is pressed against the edge portion on the positive side of the Y-axis direction of the lens barrel base 33 and presses the edge portion (the lens barrel base 33) to the positive side of the Z-axis direction (see reference sign F2 in FIG. 13). Also, the third plate spring portion 76 of the mounting plate 70 is pressed against the edge portion on the positive side of the X-axis direction of the lens barrel base 33 and presses the edge portion (the lens barrel base 33) to the positive side of the Z-axis direction (see reference sign F3 in FIG. 13).

Figure 14:
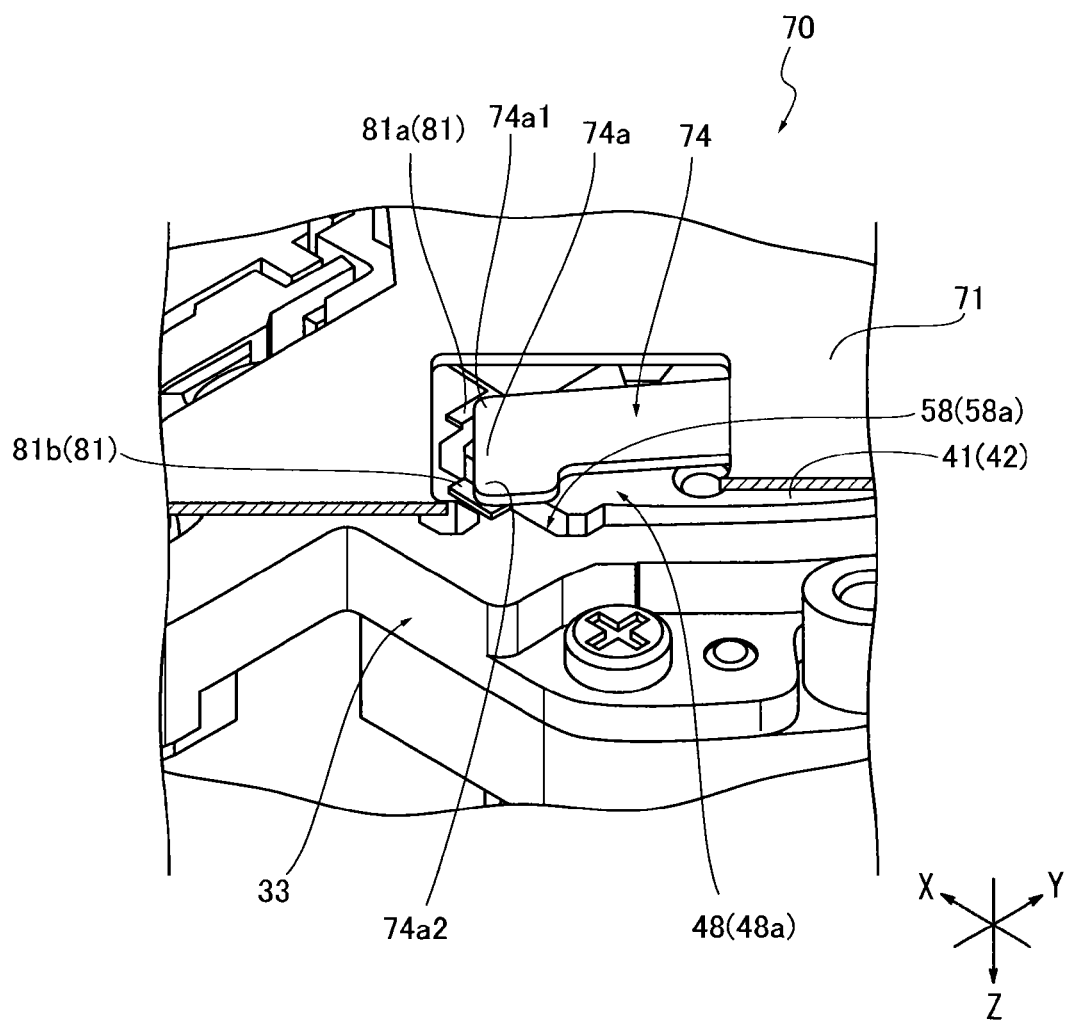
FIG. 14 is an illustration partially showing an enlarged cross-section of a portion shown by a reference sign Ci in FIG. 13.

Then, the first plate spring portion 74 of the mounting plate 70 is pressed against the pressed portion 81 of the lens barrel base 33 and presses the pressed portion 81 (the lens barrel base 33) to the positive side of the Z-axis direction (see reference sign F1 in FIG. 13). As shown in FIG. 14 and the like, at this time, with the positional relationship between the first plate spring portion 74 and the pressed portion 81, the corner portion 74a1 of the protruding end portion 74a of the first plate spring portion 74 is pressed against the pressed portion 81a present on the positive side of the X-axis direction with respect to the installation recessed portion 58a and the corner portion 74a2 of the protruding end portion 74a of the first plate spring portion 74 is pressed against the pressed portion 81b present on the negative side of the Y-axis direction with respect to the installation recessed portion 58a. Here, the pressed portion 81a and the pressed portion 81b are positioned equally when seen in the Z-axis direction (the direction of the imaging optical axis OA). Thus, the position of the protruding end portion 74a of the first plate spring portion 74 is determined in the Z-axis direction with respect to the lens barrel base 33 (the lens barrel 13). Also, the protruding end portion 74a of the first plate spring portion 74 is present on the positive side of the Z-axis direction of the installation recessed portion 58a to bridge above the ball supporting plate 59a provided in the installation recessed portion 58a of the lens barrel base 33 (see FIG. 14 and FIG. 15). As described above, since the ball receiving portion 48a of the actuation stage 41 (the movable frame portion 42) is disposed in the installation recessed portion 58a, the protruding end portion 74a of the first plate spring portion 74 bridges above the pressed portion 81a and the pressed portion 81b on the installation recessed portion 58a on the positive side of the Z-axis direction of the ball receiving portion 48a of the actuation stage 41 (the movable frame portion 42) along the X-Y plane.

For this reason, the mounting plate 70 presses the lens barrel base 33, i.e., the lens barrel 13 toward the positive side of the Z-axis direction by each plate spring portion (the first plate spring portion 74, the second plate spring portion 75, and the third plate spring portion 76) with respect to the rear side cover member 11a to which the mounting plate 70 itself is fixed in the casing 11. Accordingly, the mounting plate 70 can press the lens barrel 13 against the front side cover member 11b, and the position of the lens barrel 13 in the casing 11 in the Z-axis direction can be defined. For this reason, each plate spring portion (the first plate spring portion 74, the second plate spring portion 75, and the third plate spring portion 76) of the mounting plate 70 satisfies the following inequality (1). Here, it is assumed that a weight of the lens barrel 13 is M.

Also, it is assumed that force of the first plate spring portion 74 which presses the lens barrel 13 (the lens barrel base 33) toward the positive side of the Z-axis direction is pressing force amount F1 (see FIG. 13). Similarly, it is assumed that the force of the second plate spring portion 75 which presses the lens barrel 13 (the lens barrel base 33) toward the positive side of the Z-axis direction is a pressing force amount F2, and the force of the third plate spring portion 76 which presses the lens barrel 13 (the lens barrel base 33) toward the positive side of the Z-axis direction is a pressing force amount F3 (see FIG. 13).

$$F1+F2+F3>M \qquad (1)$$

Accordingly, each plate spring portion (the first plate spring portion 74, the second plate spring portion 75, and the third plate spring portion 76) of the mounting plate 70 can press the lens barrel 13 (the lens barrel base 33) against the front side cover member 11b toward the positive side of the Z-axis direction in the casing 11. Thus, the lens barrel 13 is pressed by the each plate spring portion (the first plate spring portion 74, the second plate spring portion 75, and the third plate spring portion 76) of the mounting plate 70, so that the position of the lens barrel 13 in the Z-axis direction inside the casing 11 is properly defined and the lens barrel 13 is fixed in the casing 11. Accordingly, the position of the lens barrel base 33 (the lens barrel 13) is fixed with respect to the imaging optical axis OA, and the lens barrel base 33 functions as a fixed member provided in the casing 11. Also, the actuation stage 41 (the movable frame portion 42) in which the image pickup element 22 is provided to be movable along the X-Y plane with respect to the lens barrel base 33 functions as a movable member. Furthermore, the vertical driving coil 44 and the horizontal driving coil 46 which are provided in the movable frame portion 42 function as movable side driving mechanism units provided in the movable member and the vertical driving magnet 54, the horizontal driving magnet 55, the vertical side yoke 56 and the horizontal side yoke 57, which are provided in the lens barrel base 33 function as fixed side driving mechanism units provided in the fixed member in order to be present in a pair with respect to the movable side driving mechanism on the both sides when seen in the direction of the imaging optical axis OA.

Hereinafter, the setting of the first plate spring portion 74 and the pressed portion 81 is described. As shown in FIG. 16, in the camera shake correction mechanism 40 (the lens barrel 13), the actuation stage 41 (the movable frame portion 42) is supported with attraction of the magnetic force of the lens barrel base 33 (the rear side thereof). Then, in the camera shake correction mechanism 40 (the lens barrel 13), the movable supporting ball 62 provided on each ball supporting plate 59 of the lens barrel base 33 rolls and moves on the ball supporting plate 59, and each movable supporting ball 62 disposed inside each ball receiving portion 48 of the movable frame portion 42 rolls and moves on the ball receiving plate 49. Accordingly, the actuation stage 41 (the movable frame portion 42) moves parallel to the X-Y plane with respect to the lens barrel base 33. In this manner, in the camera shake correction mechanism 40 (the lens barrel 13), in a normal state, the actuation stage 41 (the movable frame portion 42) is supported with attraction of magnetic force by the lens barrel base 33, and ball receiving plate 49 of each ball receiving portion 48 of the movable frame portion 42 always comes in contact with each movable supporting ball 62.

Figure 17:
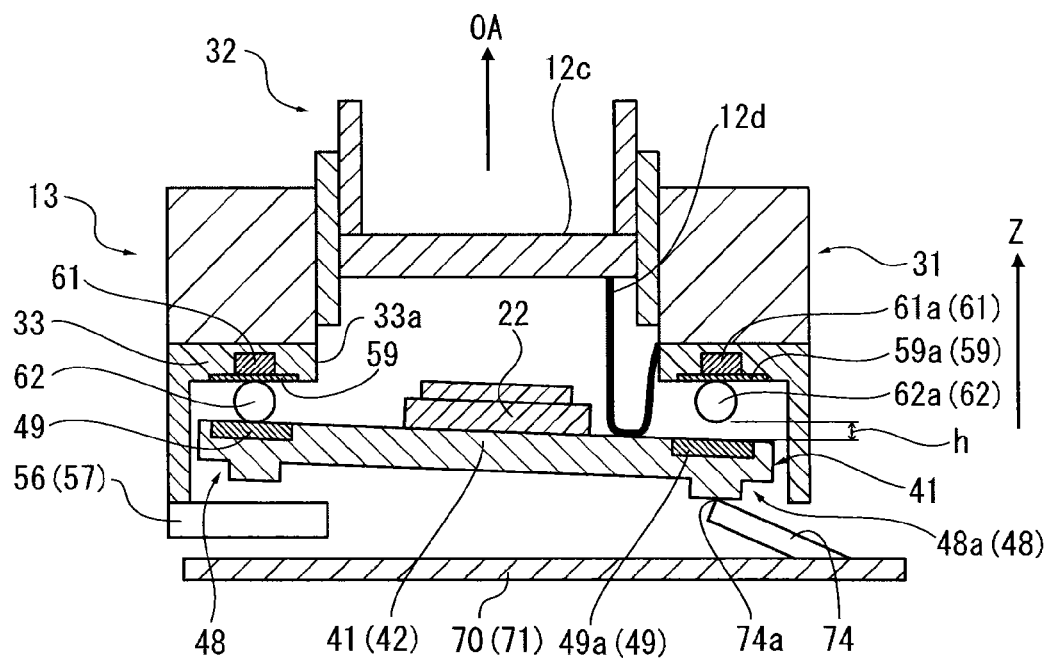
FIG. 17 is an illustration similar to FIG. 16, which schematically shows the configuration of the camera shake correction mechanism 40 and the mounting plate 70 in the lens barrel 13 and shows a state where a ball receiving plate 49a of a ball receiving portion 48a in a movable frame portion 42 and a movable supporting ball 62a are separated from each other.
Figure 18:
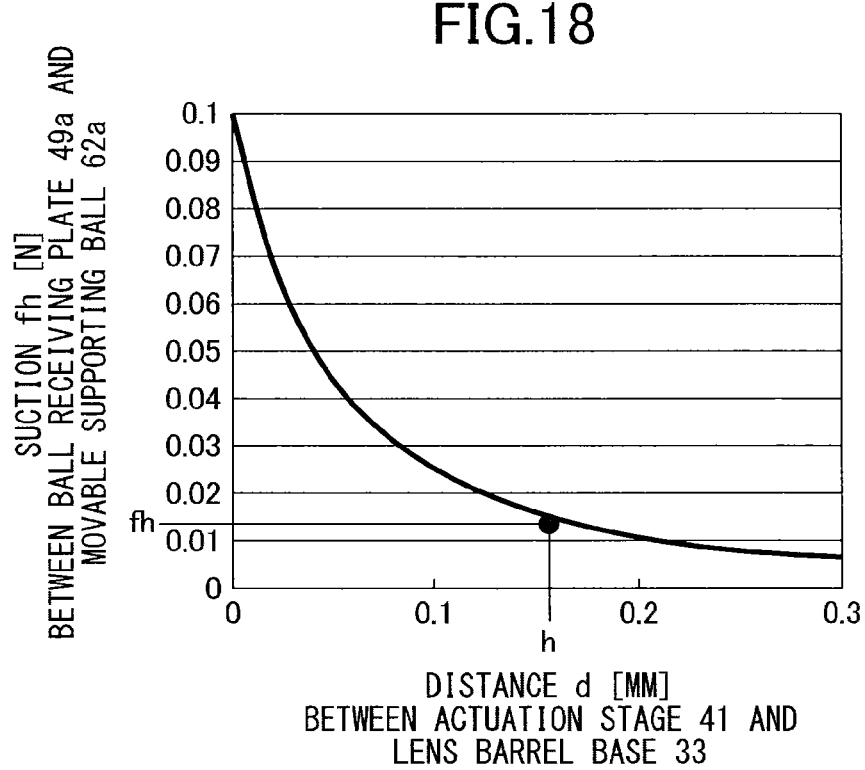

However, for example, if the digital camera 10 is dropped or unexpected contingency occurs, or the movable lens barrel 32 is moved from the extended position (the shooting standby state (see FIG. 1B)) to the predetermined stored position (see FIG. 1A), the flexible substrate 12d connected with the shutter unit 12c unintentionally presses the actuation stage 41 (the movable frame portion 42), this results in that large force acts on the actuation stage 41 in the direction detaching from the lens barrel base 33. Then, as shown in FIG. 17, the actuation stage 41 (the movable frame portion 42) is supported with attraction of magnetic force of each ball supporting magnet 61 by the lens barrel base 33, which may cause detachment from the lens barrel base 33. Here, it is assumed in each ball supporting magnet 61 that a maximum distance capable of returning to the original state (the supported state with attraction of magnetic force) with the magnetic force thereof is a limit distance h1. As shown in FIG. 18 as one example, this is caused because the suction of each ball supporting magnet 61 decreases as a distance d between the actuation stage 41 (the movable frame portion 42) and the lens barrel base 33 (a floating amount of the actuation stage 41 from the lens barrel base 33) becomes larger.

Here, the camera shake correction mechanism 40 (the lens barrel 13) of the embodiment has a positional relationship such that the vertical side yoke 56 provided in the lens barrel base 33 faces the vertical driving magnet 54 provided in the lens barrel base 33 in the Z-axis direction with the vertical driving coil 44, which is provided in the actuation stage 41 (the movable frame portion 42), interposed therebetween, configuring a voice coil motor. Accordingly, the vertical side yoke 56 and the vertical driving coil 44 have a positional relationship in which they come extremely closer in the Z-axis direction. The vertical side yoke 56 and the vertical driving coil 44 are adjacent to the installation recessed portion 58b of the lens barrel base 33 (the ball receiving plate 49b of the ball receiving portion 48b of the movable frame portion 42 and the movable supporting ball 62b adjacent thereto) when seen in the direction parallel to the X-Y plane (see FIG. 6 and FIG. 7). Thus, when the ball receiving plate 49 (the movable frame portion 42) and the movable supporting ball 62b move in the direction separating from each other in the Z-axis direction, the vertical side yoke 56 and the vertical driving coil 44 interfere each other in the Z-axis direction, which prevents them from separating exceeding the limit distance h1.

Similarly, there is a positional relationship such that the horizontal side yoke 57 provided in the lens barrel base 33 faces the horizontal driving magnet 55 provided in the lens barrel base 33 in the Z-axis direction with the horizontal driving coil 46, which is provided in the actuation stage 41 (the movable frame portion 42 thereof), interposed therebetween, configuring a voice coil motor. Accordingly, the horizontal side yoke 57 and the horizontal driving coil 46 have a positional relationship such that they come extremely closer in the Z-axis direction. The horizontal side yoke 57 and the horizontal driving coil 46 are adjacent to the installation recessed portion 58c of the lens barrel base 33 (the ball receiving plate 49c of the ball receiving portion 48c of the movable frame portion 42 and the movable supporting ball 62c adjacent thereto) when seen in the direction parallel to the X-Y plane (see FIG. 6 and FIG. 7). Thus, when the ball receiving plate 49c (the movable frame portion 42) and the movable supporting ball 62c move in the direction separating from each other in the Z-axis direction, the horizontal side yoke 57 and the horizontal driving coil 46 interfere each other in the Z-axis direction, which prevents them from separating exceeding the limit distance h1.

However, in the camera shake correction mechanism 40 (the lens barrel 13) of the present embodiment, the above-described members (the vertical side yoke 56 and the horizontal side yoke 57) are not provided in the vicinity of the installation recessed portion 58a of the lens barrel base 33. Thus, there is a possibility that the ball receiving plate 49a of the ball receiving portion 48a of the movable frame portion 42 provided therein and the movable supporting ball 62a coming in contact therewith are separated exceeding the limit distance h1 if the above-described large force acts thereon.

For this reason, the camera shake correction mechanism 40 (the lens barrel 13) has the configuration such that the first plate spring portion 74 (the protruding end portion 74a thereof) of the mounting plate 70 is pressed against the pressed portion 81 of the lens barrel base 33 in the Z-axis direction. With such configuration, the protruding end portion 74a of the first plate spring portion 74 exists bridging the positive side of the Z-axis direction of the installation recessed portion 58a going across the ball receiving portion 48a of the actuation stage 41 (the movable frame portion 42) disposed in the installation recessed portion 58a of the lens barrel base 33 (see FIG. 14 and FIG. 15). Accordingly, the protruding end portion 74a of the first spring portion 74 keeps a distance in the Z-axis direction with the ball receiving portion 48a of the movable frame portion 42 (the actuation stage 41) disposed inside the installation recessed portion 58a and faces the ball receiving portion 48a in the Z-axis direction. When it is assumed that a distance between the protruding end portion 74 (the end portion on the positive side of the Z-axis direction thereof) and the ball receiving portion 48a (the end portion on the negative side of the Z-axis direction) when seen in the Z-axis direction is a distance h (see FIG. 15B and FIG. 16), the ball receiving portion 48a (the movable frame portion 42 (the actuation stage 41)) hits the protruding end portion 74a of the first plate spring portion 74 when it is going to move exceeding the distance h in the Z-axis direction.

Accordingly, in the camera shake correction mechanism 40 (the lens barrel 13) of the embodiment, the first plate spring portion 74 and the pressed portion 81 are set as follows, so that the ball receiving plate 49a of the ball receiving portion 48a of the movable frame portion 42 and the movable supporting ball 62a are prevented from separating from each other exceeding the limit distance h1.

First, the movement of the actuation stage 41 in the Z-axis direction is prevented by the first plate spring portion 74 of the mounting plate 70, and thus the pressing force amount of the first plate spring portion 74 meets the following inequality (2). Here, it is assumed that a weight of the actuation stage 41 is m.

$$F1 > m \quad (2)$$

Accordingly, the first plate spring portion 74 of the mounting plate 70 can prevent the movement of the ball receiving portion 48a (the movable frame portion 42 (the actuation stage 41)) hitting the protruding end portion 74a toward the negative side of the Z-axis direction, so that the movement of the actuation stage 41 toward the negative side of the Z-axis direction exceeding the distance h can be prevented. The distance h is set to meet the above condition. Hereinafter, how to set the distance h is described.

Figure 19:
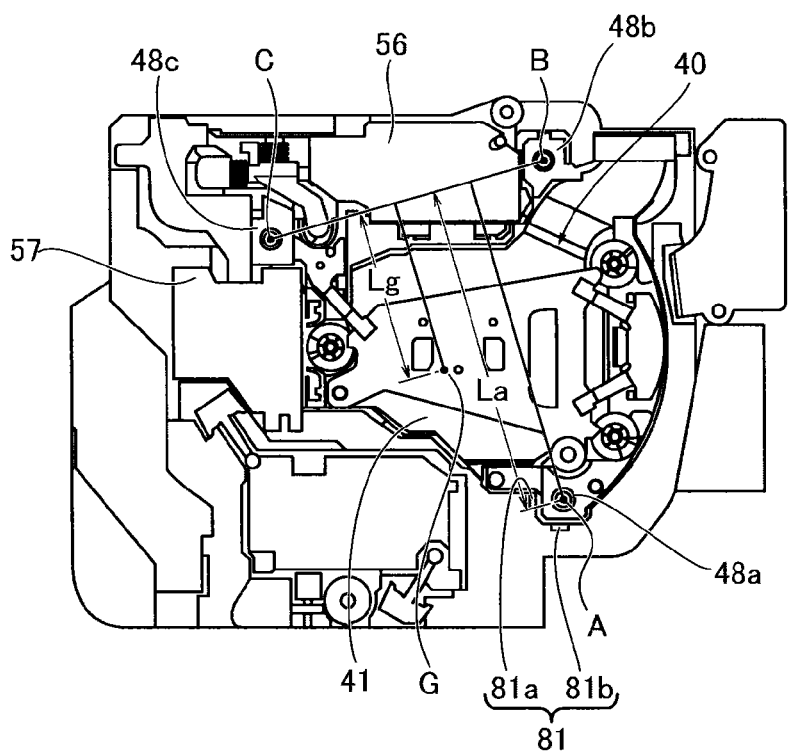
FIG. 19 is an illustration shown as a front view similar to FIG. 6 for illustrating definition of points A, B, C and G in the actuation stage 41 and distances La and Lg based thereon.

First, in the state where the ball receiving plate 49a and the movable supporting ball 62a have a distance h (a distance d=h) (see, FIG. 16), force of attraction acting on between the ball receiving plate 49a and the movable supporting ball 62a to bring the both of them come closer to each other by the magnetic force of the ball supporting magnet 61a is suction fh (see FIG. 18). Also, it is assumed that when seen on the plane parallel to the X-Y plane, as shown in FIG. 19, in the actuation stage 41, a position where the movable supporting ball 62a is provided (the ball receiving portion 48b) is a point B, a position where the movable supporting ball 62c is provided (the ball receiving portion 48c) is a point C, and a line connecting between the point B and the point C is a line segment BC. Furthermore, it is assumed that when seen on the plane parallel to the X-Y plane, in the actuation stage 41, a position where the movable supporting ball 62a is provided (the ball receiving portion 48a) is a point A, a position of the center of gravity of the actuation stage 41 is a point G, a distance from the line segment BC to the point A (a length of the vertical line passing through the point A to the line segment BC) is a distance La, a distance from the line segment BC to the point G (a length of the vertical line passing through the point G to the line segment BC) is a distance Lg.

It is assumed here that the ball receiving plate 49b and the movable supporting ball 62b come in contact with each other (corresponding to the point B) and the ball receiving plate 49c and the movable supporting ball 62c come in contact with each other (corresponding to the point C), rotation farce of weight m times distance Lg around the line segment BC acts on the actuation stage 41 by the weight m. Also, even in the state where the distance h is kept between the ball receiving plate 49a and the movable supporting ball 62a, the rotation force of suction fh times distance La around the line segment BC can be acted on the actuation stage 41 by the ball supporting magnet 61a. Accordingly, the following inequality is satisfied.

$$fh \times La > m \times Lg \quad (3)$$

If it is assumed that the inequality is satisfied, even in the state where the ball receiving plate 49a and the movable supporting ball 62a keep a distance h, the ball receiving plate 49a and the movable supporting ball 62a can be attracted again with each other with the magnetic force of the ball supporting magnet 61a. Thus, the suction fh satisfies the following inequality (4).

$$fh > m \times Lg/La \quad (4)$$

where the suction fh is a force of attraction acting on between the ball receiving plate 49a and the movable supporting ball 62a to bring them closer to each other with the magnetic force of the ball supporting magnet 61a in the state where the ball receiving plate 49 and the movable supporting ball 62a keeps a distance h. Since the distance h between the ball receiving plate 49a and the movable supporting ball 62a is a distance in the Z-axis direction between the protruding end portion 74a and the ball receiving portion 48a, the magnetic force of the ball supporting magnet 61a and the distance between the protruding end portion 74a and the ball receiving portion 48a are set to satisfy the inequality (4), so that the distance h is set smaller than the limit distance h1 (distance h<limit distance h1). Thus, the ball receiving plate 49a and the movable supporting ball 62a are prevented from separating from each other exceeding the limit distance h1.

The distance between the protruding end portion 74a and the ball receiving portion 48a is determined by the configuration of the lens barrel base 33, i.e., the position of the pressed portion 81 of the lens barrel base 33 in the Z-axis direction to which the protruding end portion 74a of the first plate spring portion 74 is pressed and the supporting position of the movable frame portion 42 in which the ball receiving portion 48a is provided, i.e., the lens barrel base 33 of the actuation stage 41 in the Z-axis direction. For this reason, the position of the actuation stage 41 (the movable frame portion 42) in the lens barrel base 33 is considered while the position of the pressed portion 81 in the Z-axis direction is set to meet the conditions. Accordingly, even when the large force acts on the actuation stage 41 (the movable frame portion 42), the ball receiving plate 49a (the actuation stage 41) and the movable supporting ball 62a (the lens barrel base 33 (the lens barrel 13)) can be prevented from separating from each other exceeding the limit distance h1 and the state where the ball receiving plate 49 and the movable supporting ball 62a come in contact with each other can be restored. Note that the weight center of the actuation stage 41 changes depending on the configuration of the actuation stage 41 or the mounting position of the image pickup element 22, but the position of the pressed portion 81 in the Z-axis direction may be set considering the above. Accordingly, the first plate spring portion 74 functions as a protruding arm portion protruding toward the positive side of the Z-axis direction (a movable member) in order to limit the movement of the actuation stage 41 by coming in contact with the actuation stage 41 (the ball receiving portion 48a of the movable frame portion 42 thereof) when the actuation stage 41 as a movable member is going to separate by the predetermined distance (the limit distance h1) with respect to the movable supporting ball 62a supported by the lens barrel base 33 (the lens barrel 13) as a fixed member (before exceeding the predetermined distance (the limit distance h1)).

For this reason, in the digital camera 10 (the image pickup apparatus) according to the invention, when the actuation stage 41 (the ball receiving plate 49a of the movable frame portion 42 thereof) as a movable member moves in a direction separating from the movable supporting ball 62a supported by the lens barrel base 33 as a fixed member, the movement of the actuation stage 41 (the ball receiving plate 49a of the movable frame portion 42 thereof) can be limited by causing the first plate spring portion 74 of the mounting plate 70 for mounting the display unit 18 on the casing 11 to hit the lens barrel base 33. In this manner, the first plate spring portion 74 to limit the movement of the actuation stage 41 with respect to the lens barrel base 33 is provided in the mounting plate 70 for mounting the display unit 18 in the casing 11. Accordingly, there is no need to provide a new member only for limiting the movement of the actuation stage 41. Thus, the layout constraint can be prevented from occurring and the size dimension in the direction of the imaging optical axis OA can be prevented from increasing.

In addition, in the digital camera 10, the first plate spring portion 74 which is caused to protrude to the positive side of the Z-axis direction from the mounting body portion 71 in the mounting plate 70 to the actuation stage 41 is caused to face the actuation stage 41 ((the ball receiving plate 49 of the movable frame portion 42 thereof)) in the Z-axis direction. Accordingly, the movement of the actuation stage 41 from the lens barrel base 33 can be limited without damaging the function of mounting the display unit 18 in the mounting plate 70 in the casing 11.

Furthermore, in the digital camera 10, the first plate spring portion 74 is formed in such a manner that the mounting body portion 71 of the mounting plate 70 is partially cut out to a U-letter shape and is bent toward the positive side of the Z-axis direction using the line portion which is not cut out as a base. Accordingly, it can be easily formed without damaging the function to mount the display unit 18 in the mounting plate 70 in the casing 11.

In the digital camera 10, when seen in the Z-axis direction, the position hitting the actuation stage 41 of the first plate spring portion 74 has a positional relationship in which it overlaps with the movable supporting ball 62a. Accordingly, the movable supporting ball 62a and the ball receiving plate 49a of the movable frame portion 42 of the actuation stage 41 coming in contact therewith are surely prevented from separating from each other exceeding the limit distance h1.

In the digital camera 10, when seen in the Z-axis direction, the position hitting the actuation stage 41 of the first plate spring portion 74 has a positional relationship in which it overlaps with the movable supporting ball 62a. Accordingly, a distance in the state where the movable supporting ball 62a and the ball receiving plate 49 of the movable frame portion 42 of the actuation stage 41 coming in contact therewith are most separated from each other can be correctly defined. Thus, the magnetic force in the ball supporting magnet 61a generating the suction between the ball receiving plate 49a and the movable supporting ball 62a can be effectively suppressed.

In the digital camera 10, the first plate spring portion 74 (the protruding end portion 74a thereof) is pressed against the pressed portion 81 provided in the lens barrel base 33, so that the position in the Z-axis direction to the actuation stage 41 (the ball receiving plate 49a of the movable frame portion 42 thereof) is defined. Thus, the actuation stage 41 is easily and properly prevented from separating from the lens barrel base 33 exceeding the limit distance h1. This is because the position of the pressed portion 81 in the Z-direction is more easily and properly set with the shape of the lens barrel base 33 as compared with the case where the position of the first plate spring portion 74 (the protruding end portion 74a) which is formed by partially bending the mounting plate 70 in the Z-axis direction is set.

In the digital camera 10, the first plate spring portion 74 is functioned as a plate spring having a flat-plate shape along the plane inclined to the mounting body portion 71 (the X-Y plane) with the mounting plate 70 being partially bent and is pressed against the pressed portion 81 of the lens barrel base 33. Accordingly, with the function as the plate spring, the pressing force amount F1 in the first plate spring portion 74 can be set and the position of the protruding end portion 74a of the first plate spring portion 74 in the Z-axis direction, i.e., a movable amount (distance h) of the actuation stage 41 to the lens barrel base 33 can be set with the position of the pressed portion 81 in the Z-axis direction. Thus, the configuration can be kept simple and the actuation stage 41 can be prevented from separating from the lens barrel base 33 exceeding the limit distance h1.

In digital camera 10, the pressed portion 81 to which the first plate spring portion 74 (the protruding end portion 74a thereof) is pressed is configured of the pressed portion 81a and the pressed portion 81b which are provided on the straight line in a position bridging above the installation recessed portion 58a (the ball supporting plate 59a) in which the movable supporting ball 62a is provided in the lens barrel base 33. Accordingly, the pressed first plate spring portion 74 (the protruding end portion 74a thereof) is easily positioned on the negative side of the Z-axis direction of the ball receiving plate 49a of the movable frame portion 42 of the actuation stage 41 (on the opposite side of an object side when seen in the direction of the imaging optical axis OA).

In the digital camera 10, the pressed portion 81a and the pressed portion 81b of the pressed portion 81 against which the first plate spring portion 74 (the protruding end portion 74a) is pressed are positioned equally in the lens barrel base 33 when seen in the direction of the imaging optical axis OA (the Z-axis direction). Accordingly, the position of the pressed first plate spring portion 74 (the protruding end portion 74a) in the Z-axis direction can be easily and properly set and a movable amount (the distance h) of the actuation stage 41 with respect to the lens barrel base 33 can be easily and properly set.

In the digital camera 10, each plate spring portion of the mounting plate 70 presses the lens barrel 13 (the lens barrel base 33) toward the positive side of the Z-axis direction to the front side cover member 11b in the casing 11, so that the position of the lens barrel 13 in the Z-axis direction in the casing 11 is properly defined. Accordingly, a function to mount the display unit 18 in the mounting plate 70 in the casing 11, a function to position the lens barrel 13 in the Z-axis direction in the casing 11, and a function to prevent the actuation stage 41 from separating from the lens barrel base 33 exceeding the limit distance h1 can be combined.

In the digital camera 10, the display unit 18 can be mounted in the casing 11 with the mounting plate 70, the position of the lens barrel 13 inside the casing 11 in the Z-axis direction can be defined, and the actuation stage 41 can be prevented from separating from the lens barrel base 33 exceeding the limit distance h1. Accordingly, there is no need to individually provide a member only for one function among the three functions. Thus, the layout constraint can be effectively prevented from occurring and the size dimension in the direction of the imaging optical axis OA can be effective prevented from increasing.

In the digital camera 10, the vertical side yoke 56 and the vertical driving coil 44 prevent the ball receiving plate 49*b* (the movable frame portion 42) and the movable supporting ball 62*b* from separating from each other exceeding the limit distance h1, and the horizontal side yoke 57 and the horizontal driving coil 46 prevent the ball receiving plate 49*c* (the movable frame portion 42) and the movable supporting ball 62*c* from separating from each other exceeding the limit distance h1. Accordingly, in cooperation with the first plate spring portion 74 of the mounting plate 70, the actuation stage 41 can be surely prevented from dropping out from the lens barrel base 33.

In the digital camera 10, the mounting plate 70 is partially bent to form a flat-plate shape along a plane inclined to the mounting body portion 71 (the X-Y plane), and a display unit 18 is mounted in the casing 11 by each plate spring portion formed as a plate spring, and the position of the lens barrel 13 in in the Z-axis direction in the casing 11 is defined, and the actuation stage 41 is prevented from separating from the lens barrel base 33 exceeding the limit distance h1. Accordingly, even in a case where large force is acted on the lens barrel 13 or the display unit 18 due to an unexpected contingency, the force can be absorbed by the elastic deformation of each plate spring portion and the state can be returned to the original state.

As described above, the digital camera 10 (the image pickup apparatus) according to the invention can suppress the layout constraint and the increase of the size dimension in the direction of the imaging optical axis OA, and can prevent the movable member (the actuation stage 41) from dropping out from the fixed member (the lens barrel base 33).

Note that although in the above-described embodiment, the digital camera 10 is described as an example of the image pickup apparatus according to the invention, the image pickup apparatus only requires to have an imaging optical system including at least one optical member, an image pickup element to acquire an object image formed by the imaging optical system, a fixed member provided in a casing in a position fixed relative to the imaging optical axis when seen in a direction perpendicular to the imaging optical axis, a plurality of movable supporting balls made of a magnetic material which is movably supported with attraction of magnetic force of the fixed member, a movable member in which the image pickup element is provided and which is movable along a plane perpendicular to the imaging optical axis with respect to the fixed member while being supported by the fixed member with the magnetic force through each movable supporting ball, a driving mechanism to generate driving force to relatively move the movable member with respect to the fixed member utilizing the force which is received by a current from a magnetic field, a display unit capable of display an object image acquired by the image pickup element, and a mounting plate to mount the display unit in the casing, the mounting plate being provided with a protruding arm portion protruding toward the movable member. Accordingly, the present invention is not limited to the above-described embodiment.

Also, the above-described embodiment has the configuration in which the first plate spring portion 74 as a protruding arm portion brings the protruding end portion 74*a* into contact with the ball receiving portion 48*a* of the movable frame portion 42 (the actuation stage 41) in order to prevent the ball receiving plate 49*a* and the movable supporting ball 62*a* from exceeding a predetermined distance (a limit distance h1). However, the first plate spring portion 74 may be provided to correspond to other ball receiving plate 49 and movable supporting ball 62 (the ball receiving plate 49*b* and the movable supporting ball 62*b* or the ball receiving plate 49*c* and the movable supporting ball 62*c*), or may be provided to correspond to a plurality (including all) of ball receiving plates 49 and movable supporting balls 62. Accordingly, the invention is not limited to the above-described embodiment.

Furthermore, although in the above-described embodiment, the first plate spring portion 74 as a protruding arm portion is formed to have a flat-plate shape along a plane of the mounting plate 70, which is partially bent and inclined to the mounting body portion 71 (the X-Y plane), when it protrudes toward the movable member to limit the movement of the movable member (the actuation stage 41) with respect to the fixed member (the lens barrel base 33), i.e., when it is going to separate from the movable supporting ball 62*a* supported by the lens barrel base 33 (the lens barrel 13) as the fixed member (before exceeding the predetermined distance (limit distance h1)), the mounting plate 70 may be formed to partially have a convex shape if it protrudes to the positive side of the Z-axis direction (the movable member) to limit the movement of the actuation stage 41 by coming in contact with the actuation stage 41 (the ball receiving portion 48*a* of the movable frame portion 42 thereof). Accordingly, the invention is not limited to the above-described embodiment.

Although the above-described embodiment has the configuration in which the protruding end portion 74*a* of the first plate spring portion 74 is pressed against the pressed portion 81 of the lens barrel base 33, as long as it is one coming in contact with the movable member to limit the movement of the movable member (the actuation stage 41) with respect to the fixed member (the lens barrel base 33), there is no need to have the configuration in which it is pressed against the pressed portion 81, i.e., the fixed member (the lens barrel base 33). Accordingly, the invention is not limited to the above-described embodiment.

Although the above-described embodiment has the configuration in which the first plate spring portion 74 (the protruding end portion 74*a*) is capable of coming in contact with the movable member (the actuation stage 41) in a position (the pressed portion 81 provided therein) overlapping with the movable supporting ball 62*a* when seen in the Z-axis direction in the fixed member (the lens barrel base 33). However, it only requires to be one coming in contact with the movable ember to limit the movement of the movable member (the actuation stage 41) with respect to the fixed member (the lens barrel base 33). Accordingly, the invention is not limited to the above-described embodiment.

In the above-described embodiment, the second plate spring portion 75 and the third plate spring portion 76 are provided in the mounting plate 70 in addition to the first plate spring portion 74 as a protruding arm portion. However, the mounting plate (70) is only needed to be one for mounting the display unit 18 in the casing, and one with a protruding arm portion (the first plate spring portion 74) to limit the movement of the actuation stage 41 with respect to the lens barrel base 33. Accordingly, the invention is not limited to the above-described embodiment.

In the above-described embodiment, the second plate spring portion 75 and the third plate spring portion 76 are provided in the mounting plate 70 in addition to the first plate spring portion 74 as a protruding arm portion. However, as long as the other plate spring portions are ones for pressing the fixed member in the direction of the imaging optical axis OA to define the position of the fixed member (the lens barrel 13) in the casing 11 in the direction of the imaging optical axis OA, the number and shape thereof may vary. Accordingly, the invention is not limited to the above-described embodiment.

In the above-described embodiment, the digital camera 10 is described. However, if the embodiment is one in which the movable member which is moved with respect to the fixed member and has an image pickup element provided therein is supported by the fixed member through a movable supporting ball with magnetic force, and one in which the display unit is provided, it may be an electronic device as a mobile information terminal device such as so-called PDA (personal data assistant) or mobile telephone or an electronic device as an image input device. Accordingly, the invention is not limited to the above-described embodiment. Recently, an electronic device with a built-in camera has been commercially available. The electronic device has an appearance slightly different from that of the digital camera 10, but often includes substantially same functions and configurations as those of the digital camera 10.

The image pickup apparatus according to the invention can suppress the layout constraint and the increase of the size dimension in the direction of the imaging optical axis, and can prevent the movable member from dropping out from the fixed member.

As described above, the image pickup apparatus according to the invention is described based on the embodiment. However, the specific configuration is not particularly limited to the embodiment, and changes or additions in designing are permitted as long as it does not depart from the scope of the invention.

What is claimed is:

1. An image pickup apparatus, comprising:
   an imaging optical system including at least one optical member;
   an image pickup device to acquire an object image formed by the imaging optical system;
   a fixed member provided in a casing at a position fixed relative to an imaging optical axis when seen in a direction perpendicular to the imaging optical axis;
   a plurality of movable supporting balls, each of the plurality of movable supporting balls being made of a magnetic material and movably supported with attraction of a magnetic force by the fixed member;
   a movable member in which the image pickup device is provided and which is movable along the imaging optical axis with respect to the fixed member while being supported by the fixed member with the magnetic force through each movable supporting ball;
   a driving mechanism configured to generate a driving force to relatively move the movable member with respect to the fixed member by utilizing a force which is received by a current from a magnetic field;
   a display configured to display the object image acquired by the image pickup device; and
   a mounting plate to mount the display unit in the casing, the mounting plate being provided with a protruding arm portion protruding toward the movable member, wherein
   the plurality of movable supporting balls are disposed on one side of the movable member, and the protruding arm portion is disposed on another side of the movable member that is opposite to the one side of the movable member.

2. The image pickup apparatus according to claim 1, wherein
   the mounting plate is made of a material capable of an elastic deformation, and
   the protruding arm portion is formed by deforming a part of the mounting plate in a direction of the imaging optical axis and produces an elastic force against an operation bringing the protruding arm portion closer to the mounting plate.

3. The image pickup apparatus according to claim 1, wherein the protruding arm portion faces the movable member in a direction of the imaging optical axis in a position overlapping with any one of the movable supporting balls in the fixed member when seen in the direction of the imaging optical axis.

4. The image pickup apparatus according to claim 2, wherein the protruding arm portion faces the movable member in the direction of the imaging optical axis in a position overlapping with any one of the movable supporting balls in the fixed member when seen in the direction of the imaging optical axis.

5. The image pickup apparatus according to claim 1, wherein a pressed portion along a plane perpendicular to the imaging optical axis is provided in the fixed member and a position of the protruding arm portion in the direction of the imaging optical axis is defined by being pressed against the pressed portion.

6. The image pickup apparatus according to claim 5, wherein
   the fixed member supports the movable supporting balls respectively in installation recessed portions which are each formed to be recessed toward a side of the imaging optical system,
   the pressed portion is provided in a peripheral position of the installation recessed portion, and
   the protruding arm portion bridges above the installation recessed portions by being pressed against the pressed portion.

7. The image pickup apparatus according to claim 1, wherein the mounting plate has at least one plate spring portion to press the fixed member against the casing in a direction of the imaging optical axis.

8. The image pickup apparatus according to claim 7, wherein
   the mounting plate is made of a material capable of an elastic deformation,
   the protruding arm portion is formed by deforming a part of the mounting plate in the direction of the imaging optical axis and produces an elastic force against an operation bringing the protruding arm portion closer to the mounting plate, and
   the mounting plate presses the fixed member against the casing in the direction of the imaging optical axis by the protruding arm portion and the plate spring portion.

9. The image pickup apparatus according to claim 1, wherein
   the driving mechanism includes:
   a movable side driving mechanism device provided in the movable member; and
   a fixed side driving mechanism device provided in the fixed member in a state of forming a pair with the movable side driving mechanism device on both sides when seen in a direction of the imaging optical axis, and
   the protruding arm portion prevents the movable member from moving in the direction of the imaging optical axis exceeding a predetermined distance with respect to each movable supporting ball with cooperation of the movable side driving mechanism device and the fixed side driving mechanism device.

10. The image pickup apparatus according to claim 1, wherein the protruding arm portion is disposed at an incline with respect to the mounting plate when seen in the direction perpendicular to the imaging optical axis.

11. The image pickup apparatus according to claim 1, wherein the protruding arm portion extends on a plane that intersects the image pickup device.

12. The image pickup apparatus according to claim 1, wherein a thickness of the protruding arm portion is equal to a thickness of the mounting plate.

13. The image pickup apparatus according to claim 1, wherein the protruding arm portion is only connected to the mounting plate.

14. The image pickup apparatus according to claim 1, wherein one of the plurality of movable supporting balls is aligned with an end of the protruding arm portion.

15. The image pickup apparatus according to claim 1, wherein a plane that extends along the imaging optical axis intersects one of the plurality of movable supporting balls and the protruding arm portion.

16. The image pickup apparatus according to claim 1, wherein a plane that extends along the imaging optical axis intersects one of the plurality of movable supporting balls and an end of the protruding arm portion.

17. The image pickup apparatus according to claim 1, wherein a plane that extends along the imaging optical axis intersects one of the plurality of movable supporting balls, the protruding arm portion, and the movable member.

18. An electronic device comprising the image pickup apparatus according to claim 1 installed therein.

* * * * *